US012117741B1

(12) United States Patent
Kobayashi et al.

(10) Patent No.: US 12,117,741 B1
(45) Date of Patent: Oct. 15, 2024

(54) ELECTROPHOTOGRAPHIC PHOTORECEPTOR, PROCESS CARTRIDGE, AND IMAGE FORMING APPARATUS

(71) Applicant: FUJIFILM BUSINESS INNOVATION CORP., Tokyo (JP)

(72) Inventors: Hiroko Kobayashi, Kanagawa (JP); Tomoya Sasaki, Kanagawa (JP); Ryosuke Fujii, Kanagawa (JP); Yuto Okazaki, Kanagawa (JP); Kosuke Narita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/357,793

(22) Filed: Jul. 24, 2023

(30) Foreign Application Priority Data

Mar. 28, 2023 (JP) ................................ 2023-052432

(51) Int. Cl.
*G03G 15/00* (2006.01)
*G03G 5/05* (2006.01)
(Continued)

(52) U.S. Cl.
CPC ......... *G03G 15/0233* (2013.01); *G03G 5/056* (2013.01); *G03G 5/075* (2013.01);
(Continued)

(58) Field of Classification Search
CPC ...... G03G 5/043; G03G 5/047; G03G 5/0539; G03G 5/0546; G03G 5/056; G03G 5/0614;
(Continued)

(56) References Cited

U.S. PATENT DOCUMENTS

2015/0050589 A1* 2/2015 Fujii ................ G03G 5/061473 430/58.75
2016/0124327 A1 5/2016 Fujii et al.
(Continued)

FOREIGN PATENT DOCUMENTS

JP 840-001959 B 2/1965
JP 2013-097300 A 5/2013
(Continued)

*Primary Examiner* — Hoang X Ngo
(74) *Attorney, Agent, or Firm* — Oliff PLC

(57) ABSTRACT

An electrophotographic photoreceptor includes a conductive base body and a multilayered photosensitive layer disposed on the conductive base body and including a charge generation layer and a charge transport layer, wherein the charge transport layer is an uppermost surface layer and contains a charge transport material, a polyester resin, and a compound (T) represented by Formula (T) below, the polyester resin includes a polyester resin (1) including at least one selected from the group consisting of a diol unit (P1) represented by Formula (P1), a diol unit (P2) represented by Formula (P2), a diol unit (P3) represented by Formula (P3), a diol unit (P5) represented by Formula (P5), and a diol unit (P6) represented by Formula (P6), the polyester resin (1) further includes a unit including a biphenyl skeleton, and end groups of the polyester resin (1) do not include fluorine atoms.

Formula (T)

$$Ar^{T1}—L^{T1}-Ar^{T2}$$

(Continued)

-continued

Formula (P1)

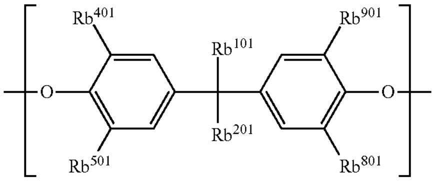

Formula (P2)

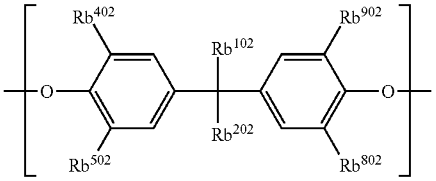

Formula (P3)

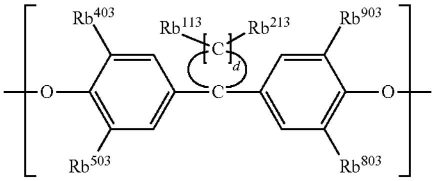

Formula (P5)

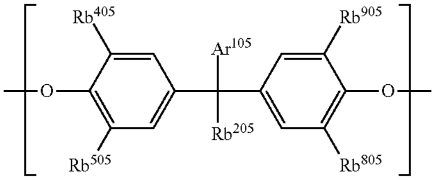

Formula (P6)

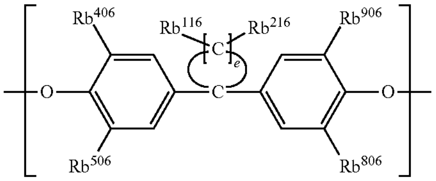

20 Claims, 3 Drawing Sheets

(51) Int. Cl.

| | |
|---|---|
| ***G03G 5/07*** | (2006.01) |
| ***G03G 15/01*** | (2006.01) |
| ***G03G 15/02*** | (2006.01) |
| ***G03G 21/00*** | (2006.01) |
| ***G03G 21/18*** | (2006.01) |
| *G03G 5/043* | (2006.01) |

(52) U.S. Cl.
CPC ..... *G03G 15/0194* (2013.01); *G03G 21/0011* (2013.01); *G03G 21/1814* (2013.01); *G03G 5/043* (2013.01); *G03G 2215/066* (2013.01); *G03G 2221/183* (2013.01)

(58) Field of Classification Search
CPC ...... G03G 5/0696; G03G 5/075; G03G 5/078; G03G 15/0194; G03G 15/0233; G03G 21/0011; G03G 21/1814; G03G 2221/183; G03G 2215/066
See application file for complete search history.

(56) References Cited

U.S. PATENT DOCUMENTS

| | | | | |
|---|---|---|---|---|
| 2019/0004442 | A1 | 1/2019 | Kaku et al. | |
| 2020/0233321 | A1* | 7/2020 | Sugimoto ............ | G03G 5/0546 |
| 2020/0233322 | A1 | 7/2020 | Choda et al. | |
| 2020/0233324 | A1* | 7/2020 | Shimizu ............... | G03G 5/0677 |
| 2021/0011391 | A1 | 1/2021 | Kudoh | |
| 2021/0286277 | A1 | 9/2021 | Shimizu | |

FOREIGN PATENT DOCUMENTS

| | | | |
|---|---|---|---|
| JP | 2015-062056 | A | 4/2015 |
| JP | 2018-159087 | A | 10/2018 |
| JP | 2019-012141 | A | 1/2019 |
| JP | 2019-035900 | A | 3/2019 |
| JP | 2020-118767 | A | 8/2020 |
| JP | 2020-181008 | A | 11/2020 |
| JP | 2021-015223 | A | 2/2021 |
| JP | 2021-071565 | A | 5/2021 |
| JP | 2021-117377 | A | 8/2021 |
| JP | 2021-148818 | A | 9/2021 |
| WO | 2019/070003 | A1 | 4/2019 |

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-052432 filed Mar. 28, 2023.

BACKGROUND

(i) Technical Field

The present disclosure relates to an electrophotographic photoreceptor, a process cartridge, and an image forming apparatus.

(ii) Related Art

Japanese Unexamined Patent Application Publication No. 2020-118767 discloses an electrophotographic photoreceptor including a conductive base body and a photosensitive layer, wherein the photosensitive layer includes a charge generation layer and a charge transport layer, the charge generation layer has a thickness of 0.07 μm or more, the charge transport layer contains a binder resin, a hole transport agent, and m-terphenyl, and the binder resin includes a polyarylate resin having a first repeating unit having a specific structure, a second repeating unit having a specific structure, and an end group having a specific structure.

Japanese Unexamined Patent Application Publication No. 2020-181008 discloses an electrophotographic photoreceptor including a conductive base body and a photosensitive layer, wherein the photosensitive layer includes a charge generation layer and a charge transport layer, the charge generation layer contains a charge generation agent, the charge transport layer contains a hole transport agent, a polyarylate resin, and an additive, the polyarylate resin includes, in a specific ratio, a repeating unit having a specific structure, and the additive includes a compound having a specific structure.

Japanese Unexamined Patent Application Publication No. 2015-062056 discloses an electrophotographic photoreceptor including, on a conductive support, a photosensitive layer, wherein an uppermost surface layer contains a charge transport substance having a specific structure and a compound having a specific structure.

SUMMARY

Aspects of non-limiting embodiments of the present disclosure relate to an electrophotographic photoreceptor in which a charge transport layer contains a charge transport material and a resin and serves as the uppermost surface layer, the electrophotographic photoreceptor having high wear resistance and high cracking resistance, compared with cases where the resin is composed of a polyester resin (PEc1) described later or cases where the charge transport layer does not contain terphenyl.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrophotographic photoreceptor comprising:

a conductive base body; and a multilayered photosensitive layer disposed on the conductive base body and including a charge generation layer and a charge transport layer, wherein the charge transport layer is an uppermost surface layer and contains a charge transport material, a polyester resin, and a compound (T) represented by Formula (T) below, the polyester resin includes a polyester resin (1) including at least one selected from the group consisting of a diol unit (P1) represented by Formula (P1), a diol unit (P2) represented by Formula (P2), a diol unit (P3) represented by Formula (P3), a diol unit (P5) represented by Formula (P5), and a diol unit (P6) represented by Formula (P6), the polyester resin (1) further includes a unit including a biphenyl skeleton, and end groups of the polyester resin (1) do not include fluorine atoms, $Ar^{T1}$-$L^{T1}$-$Ar^{T2}$ Formula (T)

in Formula (T), $Ar^{T1}$ is an optionally substituted naphthyl group or an optionally substituted biphenyl group, $L^{T1}$ is a single bond or an ether bond, and $Ar^{T2}$ is an optionally substituted aryl group having 6 or more and 12 or less carbon atoms or an optionally substituted aralkyl group having 7 or more and 20 or less carbon atoms, Formula (P1)

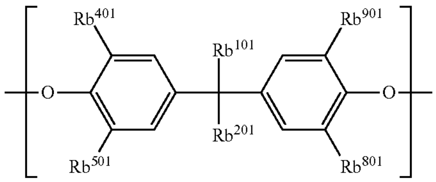

Formula (P2)

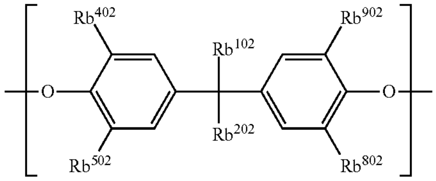

Formula (P3)

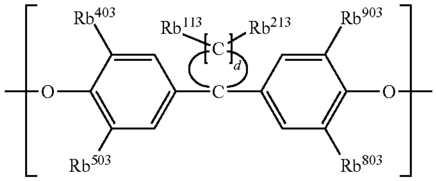

Formula (P5)

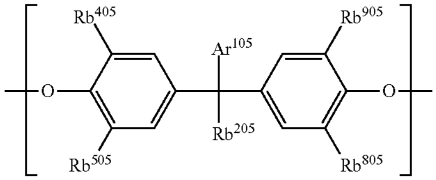

-continued

Formula (P6)

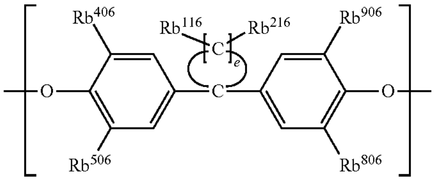

in Formula (P1), $Rb^{101}$ is a branched alkyl group having 4 or more and 20 or less carbon atoms, $Rb^{201}$ is a hydrogen atom or an alkyl group having 1 or more and 3 or less carbon atoms, and $Rb^{401}$, $Rb^{501}$, $Rb^{801}$, and $Rb^{901}$ are each independently a hydrogen atom, an alkyl group having 1 or more and 4 or less carbon atoms, an alkoxy group having 1 or more and 6 or less carbon atoms, or a halogen atom, in Formula (P2), $Rb^{102}$ is a linear alkyl group having 4 or more and 20 or less carbon atoms, $Rb^{202}$ is a hydrogen atom or an alkyl group having 1 or more and 3 or less carbon atoms, and $Rb^{402}$, $Rb^{502}$, $Rb^{802}$, and $Rb^{902}$ are each independently a hydrogen atom, an alkyl group having 1 or more and 4 or less carbon atoms, an alkoxy group having 1 or more and 6 or less carbon atoms, or a halogen atom, in Formula (P3), $Rb^{113}$ and $Rb^{213}$ are each independently a hydrogen atom, a linear alkyl group having 1 or more and 3 or less carbon atoms, an alkoxy group having 1 or more and 4 or less carbon atoms, or a halogen atom, d is an integer of 7 or more and 15 or less, and $Rb^{403}$, $Rb^{503}$, $Rb^{803}$, and $Rb^{903}$ are each independently a hydrogen atom, an alkyl group having 1 or more and 4 or less carbon atoms, an alkoxy group having 1 or more and 6 or less carbon atoms, or a halogen atom, in Formula (P5), $Ar^{105}$ is an aryl group having 6 or more and 12 or less carbon atoms or an aralkyl group having 7 or more and 20 or less carbon atoms, $Rb^{205}$ is a hydrogen atom or an alkyl group having 1 or more and 3 or less carbon atoms, and $Rb^{405}$, $Rb^{505}$, $Rb^{805}$, and $Rb^{905}$ are each independently a hydrogen atom, an alkyl group having 1 or more and 4 or less carbon atoms, an alkoxy group having 1 or more and 6 or less carbon atoms, or a halogen atom, and in Formula (P6), $Rb^{116}$ and $Rb^{216}$ are each independently a hydrogen atom, a linear alkyl group having 1 or more and 3 or less carbon atoms, an alkoxy group having 1 or more and 4 or less carbon atoms, or a halogen atom, e is an integer of 4 or more and 6 or less, and $Rb^{406}$, $Rb^{506}$, $Rb^{806}$, and $Rb^{906}$ are each independently a hydrogen atom, an alkyl group having 1 or more and 4 or less carbon atoms, an alkoxy group having 1 or more and 6 or less carbon atoms, or a halogen atom.

BRIEF DESCRIPTION OF THE DRAWINGS

Exemplary embodiments of the present disclosure will be described in detail based on the following figures, wherein.

DETAILED DESCRIPTION

Figure 1:
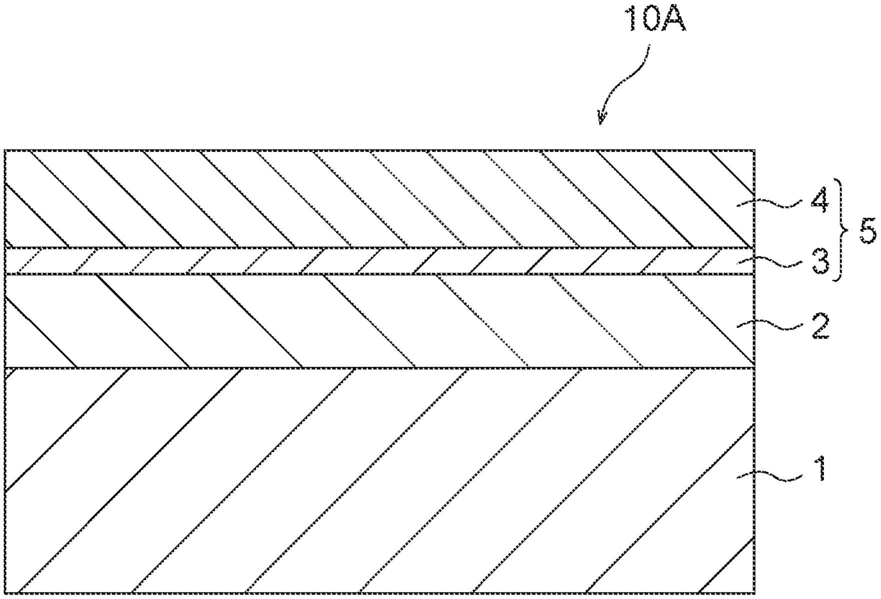
FIG. 1 is a partial sectional view illustrating an example of the layer configuration of an electrophotographic photoreceptor according to an exemplary embodiment.

Hereinafter, exemplary embodiments according to the present disclosure will be described. These descriptions and Examples are examples of the exemplary embodiments and do not limit the scope of the exemplary embodiments.

In the present disclosure, numerical ranges described as "a value 'to' another value" mean ranges including the value and the other value respectively as the minimum value and the maximum value.

In the present disclosure, of numerical ranges described in series, the upper limit value or the lower limit value of a numerical range may be replaced by the upper limit value or the lower limit value of another one of the numerical ranges described in series. For numerical ranges described in the present disclosure, the upper limit values or the lower limit values of the numerical ranges may be replaced by values described in Examples.

In the present disclosure, the term "step" includes not only an independent step, but also a step that is not clearly distinguished from another step as long as the intended result of the step is provided.

In the present disclosure, when exemplary embodiments are described with reference to drawings, the configurations according to the exemplary embodiments are not limited to the configurations illustrated in the drawings. The sizes of members in the drawings are schematically illustrated and the relative size relations between members are not limited to these.

In the present disclosure, components may each include plural substances belonging to such a component. In the present disclosure, when a composition includes plural substances belonging to a component, the amount of the component in the composition means the total amount of the plural substances in the composition unless otherwise specified.

In the present disclosure, components may each include plural particle species belonging to such a component. When a composition includes plural particle species belonging to a component, the particle size of the component means the particle size of the mixture of the plural particle species in the composition unless otherwise specified.

In the present disclosure, alkyl groups include linear, branched, and cyclic alkyl groups unless otherwise specified.

In the present disclosure, for aromatic rings, linking groups, alkyl groups, aryl groups, aralkyl groups, alkoxy groups, and aryloxy groups, hydrogen atoms in the groups may be substituted with halogen atoms.

Electrophotographic Photoreceptor

An electrophotographic photoreceptor according to an exemplary embodiment of the present disclosure includes a conductive base body and a multilayered photosensitive layer disposed on the conductive base body and including a charge generation layer and a charge transport layer, and the charge transport layer serves as the uppermost surface layer. Hereafter, the electrophotographic photoreceptor may also be referred to as "photoreceptor".

FIG. 1 is a partial sectional view schematically illustrating an example of the layer configuration of the photoreceptor according to this exemplary embodiment. Referring to FIG. 1, a photoreceptor 10A has a structure in which, on a conductive base body 1, an undercoat layer 2, a charge generation layer 3, and a charge transport layer 4 are stacked in this order, and the charge generation layer 3 and the charge transport layer 4 constitute a multilayered photosensitive layer 5 (what is called, separated-function photosensitive layer). In the photoreceptor 10A, the charge transport layer 4 serves as the uppermost surface layer. The photoreceptor 10A may include an intermediate layer (not shown) between the undercoat layer 2 and the charge generation layer 3. The photoreceptor 10A does not necessarily include the undercoat layer 2.

In the photoreceptor according to this exemplary embodiment, the charge transport layer serving as the uppermost surface layer contains a charge transport material, a polyester resin, and a compound (T) represented by Formula (T) below, wherein the polyester resin includes a polyester resin (1) including at least one selected from the group consisting of a diol unit (P1) represented by Formula (P1), a diol unit (P2) represented by Formula (P2), a diol unit (P3) represented by Formula (P3), a diol unit (P5) represented by Formula (P5), and a diol unit (P6) represented by Formula (P6). The polyester resin (1) further includes a unit including a biphenyl skeleton and end groups of the polyester resin (1) do not include fluorine atoms. The end groups are groups that constitute the ends of the molecular structure of the polyester resin (1) and that bond to a diol unit or a dicarboxylic acid unit described later, and do not include diol units or dicarboxylic acid units.

Hereafter, at least one selected from the group consisting of the diol unit (P1), the diol unit (P2), the diol unit (P3), the diol unit (P5), and the diol unit (P6) may also be referred to as "specific diol unit".

$$Ar^{T1}\text{-}L^{T1}\text{-}Ar^{T2} \qquad \text{Formula (T)}$$

In Formula (T), $Ar^{T1}$ is an optionally substituted naphthyl group or an optionally substituted biphenyl group, $L^{T1}$ is a single bond or an ether bond, and $Ar^{T2}$ is an optionally substituted aryl group having 6 or more and 12 or less carbon atoms or an optionally substituted aralkyl group having 7 or more and 20 or less carbon atoms.

Formula (P1)

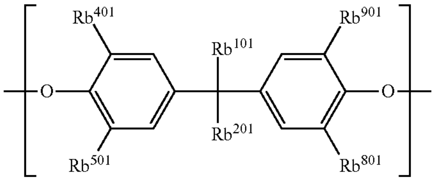

Formula (P2)

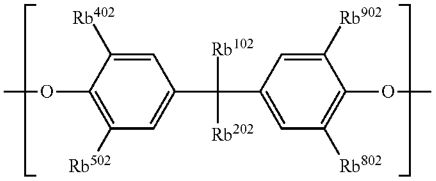

Formula (P3)

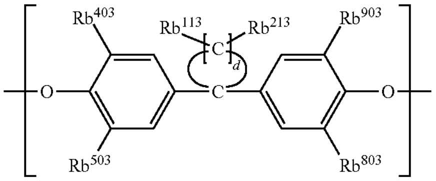

Formula (P5)

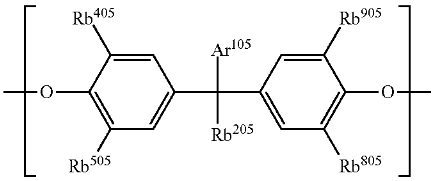

-continued

Formula (P6)

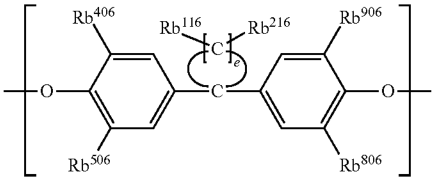

In Formula (P1), $Rb^{101}$ is a branched alkyl group having 4 or more and 20 or less carbon atoms, $Rb^{201}$ is a hydrogen atom or an alkyl group having 1 or more and 3 or less carbon atoms, and $Rb^{401}$, $Rb^{501}$, $Rb^{801}$, and $Rb^{901}$ are each independently a hydrogen atom, an alkyl group having 1 or more and 4 or less carbon atoms, an alkoxy group having 1 or more and 6 or less carbon atoms, or a halogen atom.

In Formula (P2), $Rb^{102}$ is a linear alkyl group having 4 or more and 20 or less carbon atoms, $Rb^{202}$ is a hydrogen atom or an alkyl group having 1 or more and 3 or less carbon atoms, and $Rb^{402}$, $Rb^{502}$, $Rb^{802}$, and $Rb^{902}$ are each independently a hydrogen atom, an alkyl group having 1 or more and 4 or less carbon atoms, an alkoxy group having 1 or more and 6 or less carbon atoms, or a halogen atom.

In Formula (P3), $Rb^{113}$ and $Rb^{213}$ are each independently a hydrogen atom, a linear alkyl group having 1 or more and 3 or less carbon atoms, an alkoxy group having 1 or more and 4 or less carbon atoms, or a halogen atom, d is an integer of 7 or more and 15 or less, and $Rb^{403}$, $Rb^{503}$, $Rb^{803}$, and $Rb^{903}$ are each independently a hydrogen atom, an alkyl group having 1 or more and 4 or less carbon atoms, an alkoxy group having 1 or more and 6 or less carbon atoms, or a halogen atom.

In Formula (P5), $Ar^{105}$ is an aryl group having 6 or more and 12 or less carbon atoms or an aralkyl group having 7 or more and 20 or less carbon atoms, $Rb^{205}$ is a hydrogen atom or an alkyl group having 1 or more and 3 or less carbon atoms, and $Rb^{405}$, $Rb^{505}$, $Rb^{805}$, and $Rb^{905}$ are each independently a hydrogen atom, an alkyl group having 1 or more and 4 or less carbon atoms, an alkoxy group having 1 or more and 6 or less carbon atoms, or a halogen atom.

In Formula (P6), $Rb^{116}$ and $Rb^{216}$ are each independently a hydrogen atom, a linear alkyl group having 1 or more and 3 or less carbon atoms, an alkoxy group having 1 or more and 4 or less carbon atoms, or a halogen atom, e is an integer of 4 or more and 6 or less, and $Rb^{406}$. $Rb^{506}$. $Rb^{806}$, and $Rb^{906}$ are each independently a hydrogen atom, an alkyl group having 1 or more and 4 or less carbon atoms, an alkoxy group having 1 or more and 6 or less carbon atoms, or a halogen atom.

The photoreceptor according to this exemplary embodiment includes the above-described features and, as a result, may have high wear resistance and high cracking resistance. The reason for this has not been clarified, but is inferred as follows.

When a photoreceptor in which a charge transport layer containing resin serves as the uppermost surface layer is used for an image forming apparatus including a cleaning blade that cleans the surface of the photoreceptor, the cleaning blade rubs the surface of the photoreceptor, which can result in reduction and wear of the surface of the photoreceptor.

In the case of entry of an acicular, conductive foreign substance such as carbon fiber or in the case of generation of a foreign substance due to wear of another member within the image forming apparatus, such foreign substances can pierce the uppermost surface layer of the photoreceptor, to generate cracks. In particular, when deep cracks are generated in the uppermost surface of the photoreceptor, a local drop in the potential or leakage can occur, and charge transport can be blocked, which can result in generation of dot-like image defects (such as black dots).

In order to address these, in this exemplary embodiment, the charge transport layer serving as the uppermost surface layer contains a polyester resin (1) including a specific diol unit. Thus, for example, compared with cases where the resins contained in such charge transport layers are polycarbonate resins, the charge transport layer may have a high elastic deformation ratio and may conform well to the cleaning blade, which may result in suppression of reduction and wear of the surface layer.

In addition, in this exemplary embodiment, the charge transport layer serving as the uppermost surface layer contains the polyester resin (1) including a specific diol unit and a unit including a biphenyl skeleton and a compound (T). The specific diol unit has a structure in which a bulky group is bonded to a carbon atom sandwiched between two benzene rings. The steric hindrance of the bulky group may result in formation of spaces between molecular chains of the polyester resin (1); into the spaces, the compound (T) may tend to enter and the compound (T) having entered the spaces may tend to be packed with the biphenyl skeleton. The interaction between the polyester resin (1) and the compound (T) may increase the cohesion of the whole charge transport layer and may provide increased strength, so that the charge transport layer may become less likely to wear and may become less likely to undergo cracking due to piercing of acicular foreign substances; even when the charge transport layer cracks, the cracks may tend not to become deep. Thus, generation of dot-like image defects due to deep cracks may be suppressed. Furthermore, end groups of the polyester resin (1) do not include fluorine atoms, so that the decrease in the durability against shearing stress due to entanglement of resin molecular chains may be suppressed, which may result in even higher wear resistance.

For the above-described reasons, this exemplary embodiment inferentially may provide high wear resistance and high cracking resistance.

Hereinafter, the polyester resin and the compound (T) contained in the charge transport layer and layers of the photoreceptor will be described in detail.

Polyester Resin

The polyester resin contained in the charge transport layer includes at least a polyester resin (1).

The polyester resin may contain a polyester resin other than the polyester resin (1). Relative to the whole polyester resin contained in the charge transport layer, the mass ratio of the polyester resin (1) is preferably 80 mass % or more, more preferably 90 mass % or more, still more preferably 95 mass % or more, particularly preferably 100 mass %.

The polyester resin (1) is not particularly limited as long as it includes a specific diol unit, specifically, at least one selected from the group consisting of a diol unit (P1), a diol unit (P2), a diol unit (P3), a diol unit (P5), and a diol unit (P6), and a unit including a biphenyl skeleton, and end groups do not include fluorine atoms. In particular, the polyester resin (1) preferably includes at least one selected from the group consisting of the diol unit (P1), the diol unit (P2), the diol unit (P3), and the diol unit (P6); more preferably includes at least one selected from the group consisting of the diol unit (P1), the diol unit (P2), and the diol unit (P3); still more preferably includes at least one selected from the group consisting of the diol unit (P1) and the diol unit (P2).

Hereinafter, the diol units will be described in detail.

Formula (P1)

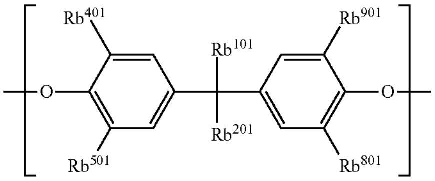

In Formula (P1), $Rb^{101}$ is a branched alkyl group having 4 or more and 20 or less carbon atoms, $Rb^{201}$ is a hydrogen atom or an alkyl group having 1 or more and 3 or less carbon atoms, and $Rb^{401}$, $Rb^{501}$, $Rb^{801}$, and $Rb^{901}$ are each independently a hydrogen atom, an alkyl group having 1 or more and 4 or less carbon atoms, an alkoxy group having 1 or more and 6 or less carbon atoms, or a halogen atom.

In $Rb^{101}$, for the branched alkyl group having 4 or more and 20 or less carbon atoms, the number of carbon atoms is preferably 4 or more and 16 or less, more preferably 4 or more and 12 or less, still more preferably 4 or more and 8 or less. In $Rb^{101}$, for the branched alkyl group, the number of carbon atoms is, from the viewpoint of improving the cracking resistance, preferably 5 or more, more preferably 6 or more, still more preferably 7 or more. Specific examples of $Rb^{101}$ include an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Formula (P2)

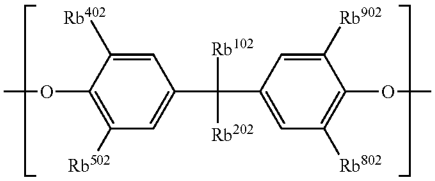

In Formula (P2), $Rb^{102}$ is a linear alkyl group having 4 or more and 20 or less carbon atoms, $Rb^{202}$ is a hydrogen atom or an alkyl group having 1 or more and 3 or less carbon atoms, and $Rb^{402}$, $Rb^{502}$, $Rb^{802}$, and $Rb^{902}$ are each independently a hydrogen atom, an alkyl group having 1 or more and 4 or less carbon atoms, an alkoxy group having 1 or more and 6 or less carbon atoms, or a halogen atom.

In $Rb^{102}$, for the linear alkyl group having 4 or more and 20 or less carbon atoms, the number of carbon atoms is preferably 4 or more and 16 or less, more preferably 4 or more and 12 or less, still more preferably 4 or more and 10 or less. In $Rb^{102}$, for the linear alkyl group, the number of carbon atoms is, from the viewpoint of improving the cracking resistance, preferably 5 or more, more preferably 6 or more, still more preferably 7 or more, particularly preferably 8 or more, extremely preferably 9 or more. Specific examples of $Rb^{102}$ include an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Formula (P3)

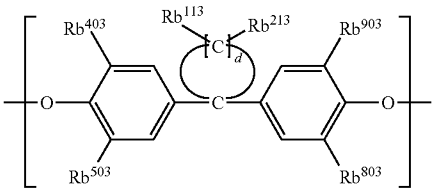

In Formula (P3), $Rb^{113}$ and $Rb^{213}$ are each independently a hydrogen atom, a linear alkyl group having 1 or more and 3 or less carbon atoms, an alkoxy group having 1 or more and 4 or less carbon atoms, or a halogen atom, d is an integer of 7 or more and 15 or less, and $Rb^{403}$, $Rb^{503}$, $Rb^{803}$, and $Rb^{903}$ are each independently a hydrogen atom, an alkyl group having 1 or more and 4 or less carbon atoms, an alkoxy group having 1 or more and 6 or less carbon atoms, or a halogen atom.

In $Rb^{113}$ and $Rb^{213}$, for the linear alkyl group having 1 or more and 3 or less carbon atoms, the number of carbon atoms is preferably 1 or 2, more preferably 1. Specific examples of the group include a methyl group, an ethyl group, and an n-propyl group.

In $Rb^{113}$ and $Rb^{213}$, for the alkoxy group having 1 or more and 4 or less carbon atoms, the alkyl group may be linear, branched, or cyclic. For the alkoxy group having 1 or more and 4 or less carbon atoms, the number of carbon atoms of the alkyl group is preferably 1 or more and 3 or less, more preferably 1 or 2, still more preferably 1. Specific examples of the group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

In $Rb^{113}$ and $Rb^{213}$, examples of the halogen atom include a fluorine atom, a chlorine atom, a bromine atom, and an iodine atom.

In Formula (P3), $Rb^{113}$ and $Rb^{213}$ are each independently, from the viewpoint of improving the cracking resistance, preferably a hydrogen atom, a methyl group, or a methoxy group, more preferably a hydrogen atom or a methyl group, still more preferably a hydrogen atom.

In Formula (P3), d is, from the viewpoint of improving the wear resistance and improving the cracking resistance, preferably an integer of 7 or more and 13 or less, more preferably an integer of 9 or more and 11 or less.

Formula (P5)

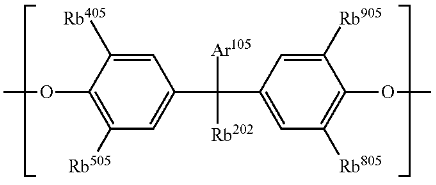

In Formula (P5), $Ar^{105}$ is an aryl group having 6 or more and 12 or less carbon atoms or an aralkyl group having 7 or more and 20 or less carbon atoms, $Rb^{205}$ is a hydrogen atom or an alkyl group having 1 or more and 3 or less carbon atoms, and $Rb^{405}$, $Rb^{505}$, $Rb^{805}$, and $Rb^{905}$ are each independently a hydrogen atom, an alkyl group having 1 or more and 4 or less carbon atoms, an alkoxy group having 1 or more and 6 or less carbon atoms, or a halogen atom.

In $Ar^{105}$, the aryl group having 6 or more and 12 or less carbon atoms may be monocyclic or polycyclic. The number of carbon atoms of the aryl group is preferably 6 or more and 10 or less, more preferably 6.

In $Ar^{105}$, for the aralkyl group having 7 or more and 20 or less carbon atoms, the alkyl group may be linear, branched, or cyclic. For the aralkyl group having 7 or more and 20 or less carbon atoms, the number of carbon atoms of the alkyl group is preferably 1 or more and 4 or less, more preferably 1 or more and 3 or less, still more preferably 1 or 2. In $Ar^{105}$, for the aralkyl group having 7 or more and 20 or less carbon atoms, the aryl group may be monocyclic or polycyclic. The number of carbon atoms of the aryl group is preferably 6 or more and 10 or less, more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracylmethyl group, and a phenyl-cyclopentylmethyl group.

Formula (P6)

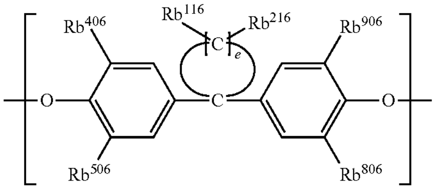

In Formula (P6), $Rb^{116}$ and $Rb^{216}$ are each independently a hydrogen atom, a linear alkyl group having 1 or more and 3 or less carbon atoms, an alkoxy group having 1 or more and 4 or less carbon atoms, or a halogen atom, e is an integer of 4 or more and 6 or less, and $Rb^{406}$. $Rb^{506}$, $Rb^{806}$, and $Rb^{906}$ are each independently a hydrogen atom, an alkyl group having 1 or more and 4 or less carbon atoms, an alkoxy group having 1 or more and 6 or less carbon atoms, or a halogen atom.

In $Rb^{116}$ and $Rb^{216}$, for the linear alkyl group having 1 or more and 3 or less carbon atoms, the number of carbon atoms is preferably 1 or 2, more preferably 1. Specific examples of the group include a methyl group, an ethyl group, and an n-propyl group.

In $Rb^{116}$ and $Rb^{216}$, for the alkoxy group having 1 or more and 4 or less carbon atoms, the alkyl group may be linear, branched, or cyclic. For the alkoxy group having 1 or more and 4 or less carbon atoms, the number of carbon atoms of the alkyl group is preferably 1 or more and 3 or less, more preferably 1 or 2, still more preferably 1. Specific examples of the group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

In $Rb^{116}$ and $Rb^{216}$, examples of the halogen atom include a fluorine atom, a chlorine atom, a bromine atom, and an iodine atom.

$Rb^{201}$ in Formula (P1), $Rb^{202}$ in Formula (P2), and $Rb^{205}$ in Formula (P5) share specific examples and exemplary examples and hence hereinafter $Rb^{201}$, $Rb^{202}$, and $Rb^{205}$ will be collectively described as "$Rb^{200}$".

In $Rb^{200}$, the alkyl group having 1 or more and 3 or less carbon atoms may be linear, branched, or cyclic. The number of carbon atoms of the alkyl group is preferably 1 or 2, more preferably 1.

Examples of the alkyl group having 1 or more and 3 or less carbon atoms include a methyl group, an ethyl group, an n-propyl group, an isopropyl group, and a cyclopropyl group.

$Rb^{401}$ in Formula (P1), $Rb^{402}$ in Formula (P2), $Rb^{403}$ in Formula (P3), $Rb^{405}$ in Formula (P5), and $Rb^{406}$ in Formula (P6) share specific examples and exemplary examples and hence hereinafter $Rb^{401}$, $Rb^{402}$, $Rb^{403}$, $Rb^{405}$, and $Rb^{406}$ will be collectively described as "$Rb^{400}$".

In $Rb^{400}$, the alkyl group having 1 or more and 4 or less carbon atoms may be linear, branched, or cyclic. The number of carbon atoms of the alkyl group is preferably 1 or more and 3 or less, more preferably 1 or 2, still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

In $Rb^{400}$, for the alkoxy group having 1 or more and 6 or less carbon atoms, the alkyl group may be linear, branched, or cyclic. For the alkoxy group having 1 or more and 6 or less carbon atoms, the number of carbon atoms of the alkyl group is preferably 1 or more and 4 or less, more preferably 1 or more and 3 or less, still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

In $Rb^{400}$, examples of the halogen atom include a fluorine atom, a chlorine atom, a bromine atom, and an iodine atom.

$Rb^{501}$ in Formula (P1), $Rb^{502}$ in Formula (P2), $Rb^{503}$ in Formula (P3), $Rb^{505}$ in Formula (P5), and $Rb^{506}$ in Formula (P6) share specific examples and exemplary examples and hence hereinafter $Rb^{501}$, $Rb^{502}$, $Rb^{503}$, $Rb^{505}$, and $Rb^{506}$ will be collectively described as "$Rb^{500}$".

In $Rb^{500}$, the alkyl group having 1 or more and 4 or less carbon atoms may be linear, branched, or cyclic. The number of carbon atoms of the alkyl group is preferably 1 or more and 3 or less, more preferably 1 or 2, still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

In $Rb^{500}$, for the alkoxy group having 1 or more and 6 or less carbon atoms, the alkyl group may be linear, branched, or cyclic. For the alkoxy group having 1 or more and 6 or less carbon atoms, the number of carbon atoms of the alkyl group is preferably 1 or more and 4 or less, more preferably 1 or more and 3 or less, still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

In $Rb^{500}$, examples of the halogen atom include a fluorine atom, a chlorine atom, a bromine atom, and an iodine atom.

$Rb^{801}$ in Formula (P1), $Rb^{802}$ in Formula (P2), $Rb^{803}$ in Formula (P3), $Rb^{805}$ in Formula (P5), and $Rb^{806}$ in Formula (P6) share specific examples and exemplary examples and hence hereinafter $Rb^{801}$. $Rb^{802}$. $Rb^{803}$. $Rb^{805}$, and $Rb^{806}$ will be collectively described as "$Rb^{800}$".

In $Rb^{800}$, the alkyl group having 1 or more and 4 or less carbon atoms may be linear, branched, or cyclic. The number of carbon atoms of the alkyl group is preferably 1 or more and 3 or less, more preferably 1 or 2, still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

In $Rb^{800}$, for the alkoxy group having 1 or more and 6 or less carbon atoms, the alkyl group may be linear, branched, or cyclic. For the alkoxy group having 1 or more and 6 or less carbon atoms, the number of carbon atoms of the alkyl group is preferably 1 or more and 4 or less, more preferably 1 or more and 3 or less, still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

In $Rb^{800}$, examples of the halogen atom include a fluorine atom, a chlorine atom, a bromine atom, and an iodine atom.

$Rb^{901}$ in Formula (P1), $Rb^{902}$ in Formula (P2), $Rb^{903}$ in Formula (P3), $Rb^{905}$ in Formula (P5), and $Rb^{906}$ in Formula (P6) share specific examples and exemplary examples and hence hereinafter $Rb^{901}$. $Rb^{902}$. $Rb^{903}$. $Rb^{905}$, and $Rb^{906}$ will be collectively described as "$Rb^{900}$".

In $Rb^{900}$, the alkyl group having 1 or more and 4 or less carbon atoms may be linear, branched, or cyclic. The number of carbon atoms of the alkyl group is preferably 1 or more and 3 or less, more preferably 1 or 2, still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

In $Rb^{900}$, for the alkoxy group having 1 or more and 6 or less carbon atoms, the alkyl group may be linear, branched, or cyclic. For the alkoxy group having 1 or more and 6 or less carbon atoms, the number of carbon atoms of the alkyl group is preferably 1 or more and 4 or less, more preferably 1 or more and 3 or less, still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

In $Rb^{900}$, examples of the halogen atom include a fluorine atom, a chlorine atom, a bromine atom, and an iodine atom.

Hereinafter, as specific examples of the diol unit (P1), diol units (P1-1) to (P1-10) will be described. The diol unit (P1) is not limited to these.

(P1-1)

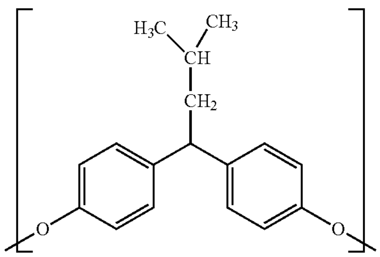

-continued (P1-2)

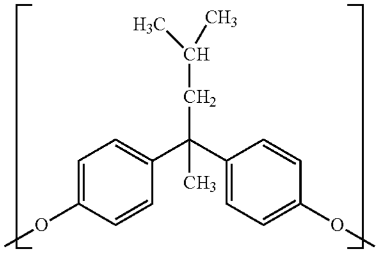

(P1-3)

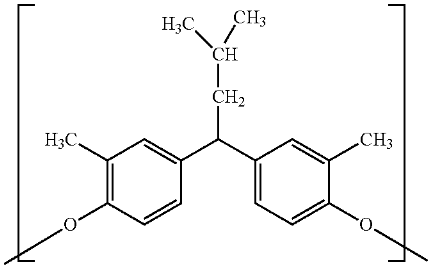

(P1-4)

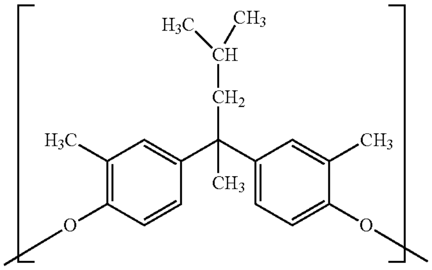

(P1-5)

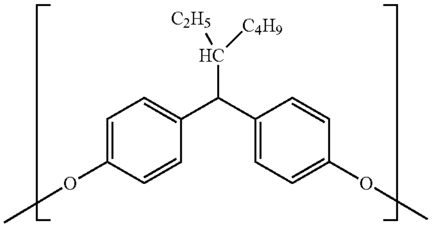

(P1-6)

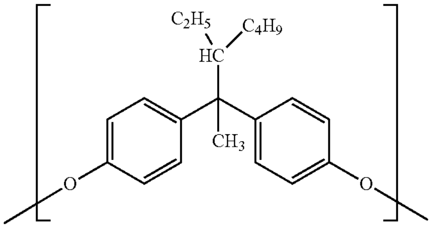

(P1-7)

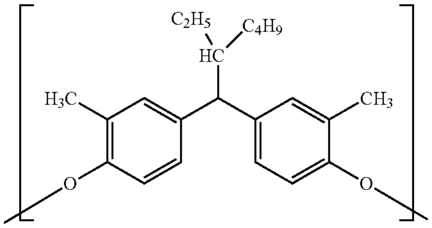

-continued
(P1-8)
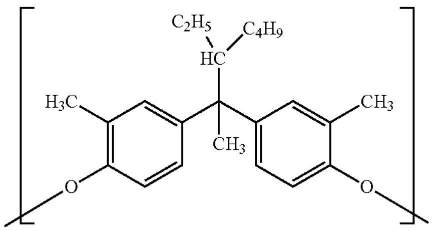
(P1-9)
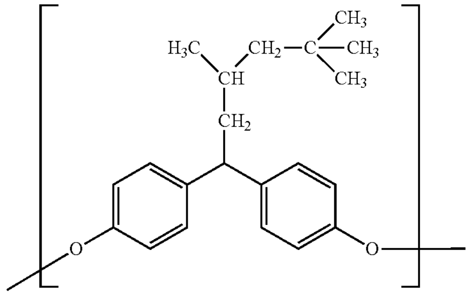
(P1-10)
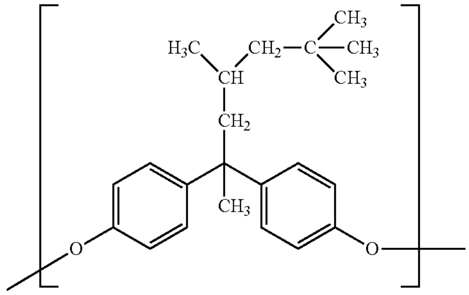
Hereinafter, as specific examples of the diol unit (P2), diol units (P2-1) to (P2-22) will be described. The diol unit (P2) is not limited to these.
(P2-1)
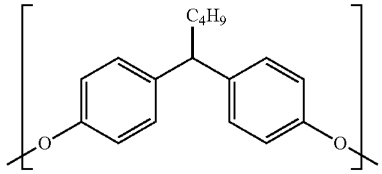
(P2-2)
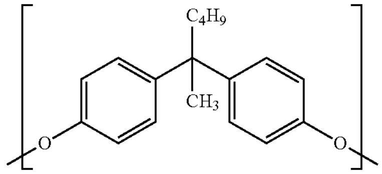
(P2-3)
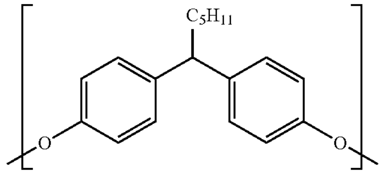
-continued
(P2-4)
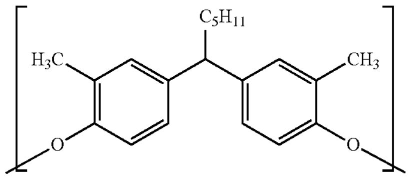
(P2-5)
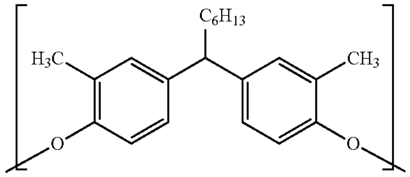
(P2-6)
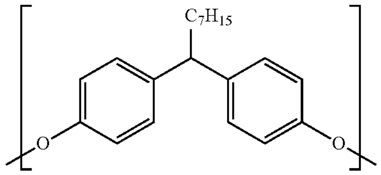
(P2-7)
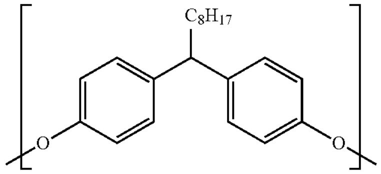
(P2-8)
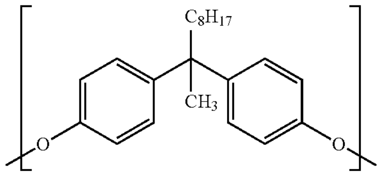
(P2-9)
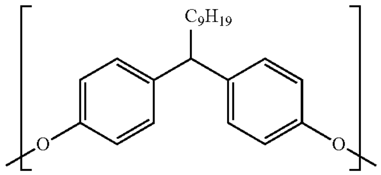
(P2-10)
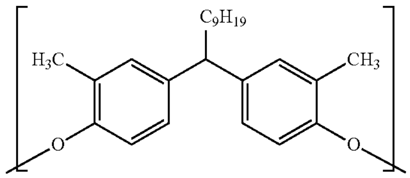
(P2-11)
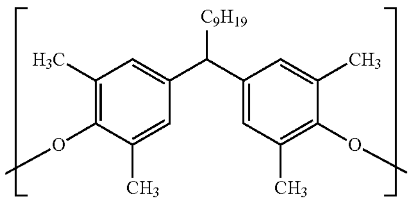

-continued
(P2-12)
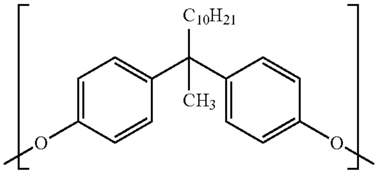
(P2-13)
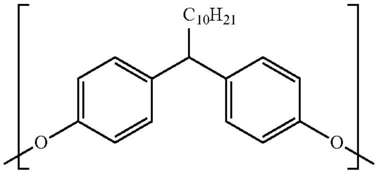
(P2-14)
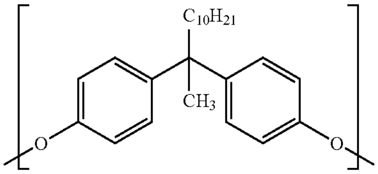
(P2-15)
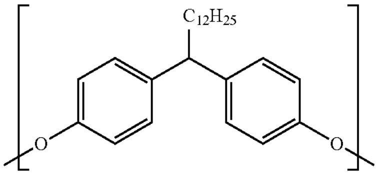
(P2-16)
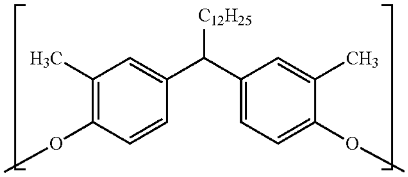
(P2-17)
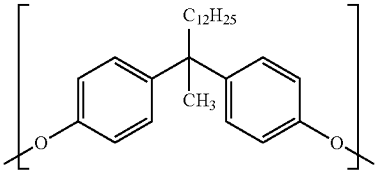
(P2-18)
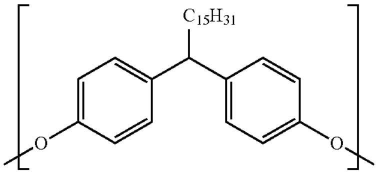
(P2-19)
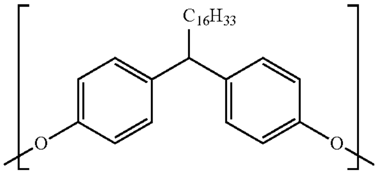
-continued
(P2-20)
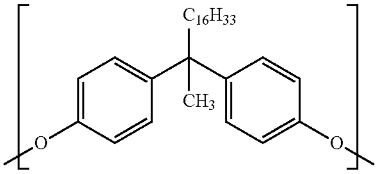
(P2-21)
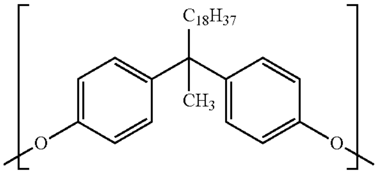
(P2-22)
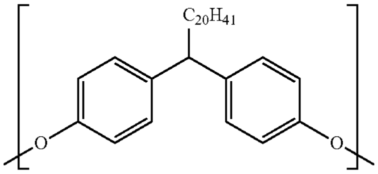
Hereinafter, as specific examples of the diol unit (P3), diol units (P3-1) to (P3-4) will be described. The diol unit (P3) is not limited to these.
(P3-1)
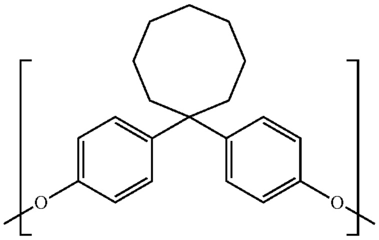
(P3-2)
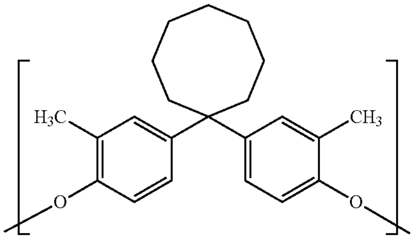
(P3-3)
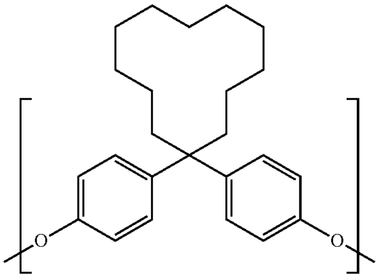

-continued
(P3-4)
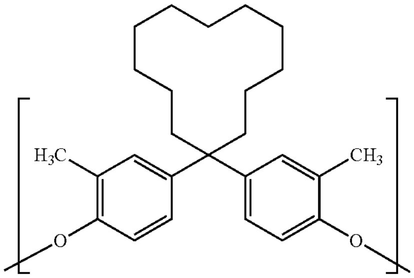
Hereinafter, as specific examples of the diol unit (P5), diol units (P5-1) to (P5-6) will be described. The diol unit (P5) is not limited to thesc.
(P5-1)
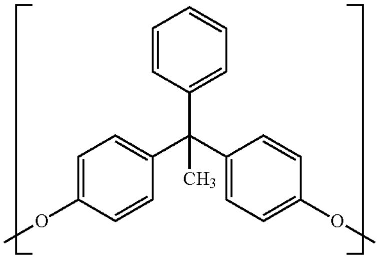
(P5-2)
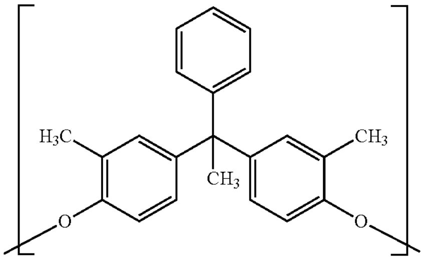
(P5-3)
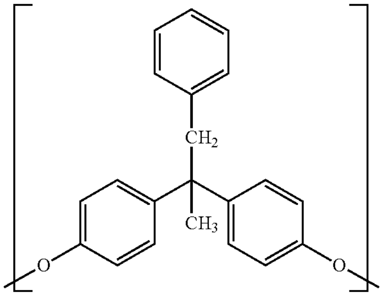
(P5-4)
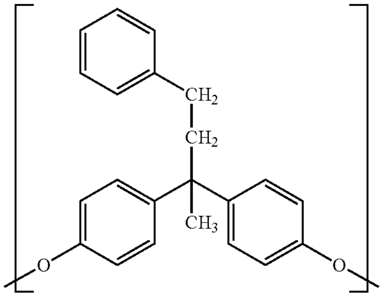
-continued
(P5-5)
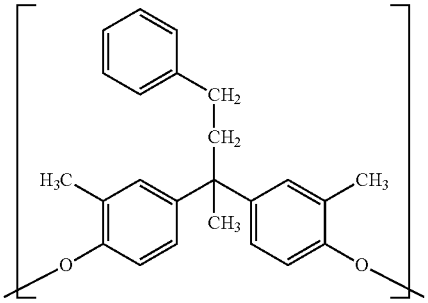
(P5-6)
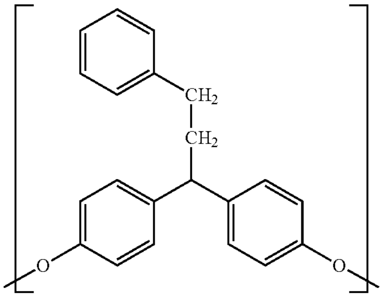
Hereinafter, as specific examples of the diol unit (P6), diol units (P6-1) to (P6-6) will be described. The diol unit (P6) is not limited to these.
(P6-1)
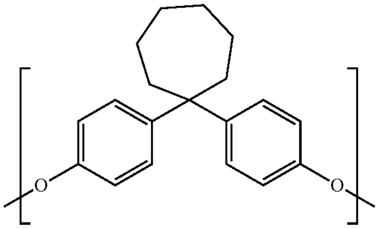
(P6-2)
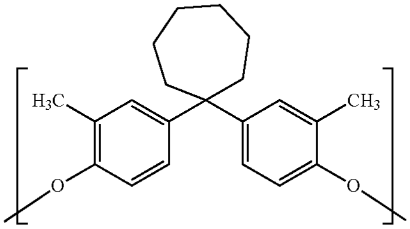
(P6-3)
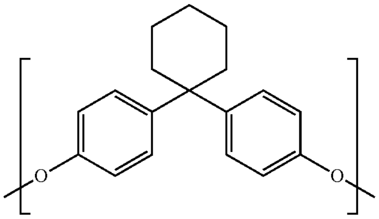

-continued (P6-4)

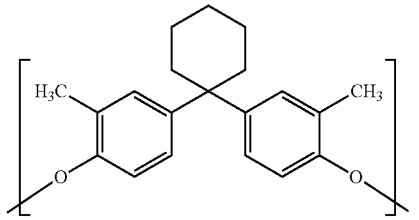

(P6-5)

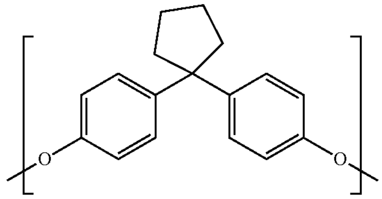

(P6-6)

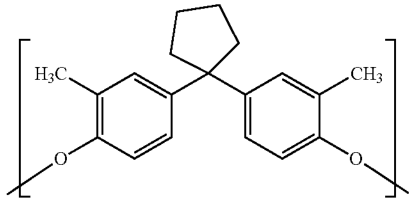

The polyester resin (1) may include one or two or more specific diol unit species.

Relative to the polyester resin (1), the total mass ratio of the specific diol unit is preferably 30 mass % or more and 90 mass % or less.

When the total mass ratio of the specific diol unit is in this range, compared with cases where it is lower than the range, high wear resistance and high cracking resistance may be provided. The reason for this has not been clarified, but is inferred that the steric hindrance of the specific diol unit may tend to provide more spaces into which the compound (T) enters. From this viewpoint, the total mass ratio of the specific diol unit is more preferably 40 mass % or more, still more preferably 50 mass % or more.

When the total mass ratio of the specific diol unit is in such a range, compared with cases where it is higher than the range, solubility in the coating liquid for forming the photosensitive layer may be maintained and improvement in the wear resistance may be achieved. From this viewpoint, the total mass ratio of the specific diol unit is more preferably 80 mass % or less, still more preferably 75 mass % or less.

The polyester resin (1) may include, of the diol units (B) represented by Formula (B) below, a diol unit (B) other than the specific diol unit.

Relative to the whole diol unit (B) of the polyester resin (1), the total mass ratio of the specific diol unit is, from the viewpoint of improving the cracking resistance, preferably 40 mass % or more, more preferably 50 mass % or more, still more preferably 80 mass % or more, particularly preferably 90 mass % or more.

Relative to the whole diol unit of the polyester resin (1), the total mass ratio of the specific diol unit is, from the viewpoint of improving the cracking resistance, preferably 40 mass % or more, more preferably 50 mass % or more, still more preferably 80 mass % or more, particularly preferably 90 mass % or more.

Formula (B)

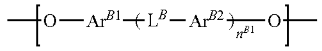

In Formula (B), $Ar^{B1}$ and $Ar^{B2}$ are each independently an optionally substituted aromatic ring. $L^B$ is a single bond, an oxygen atom, a sulfur atom, or —C($Rb^1$)($Rb^2$)—, and $n^{B1}$ is 0, 1, or 2. $Rb^1$ and $Rb^2$ are each independently a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be linked together to form a cyclic alkyl group.

In $Ar^{B1}$, the aromatic ring may be monocyclic or polycyclic. Examples of the aromatic ring include a benzene ring, a naphthalene ring, an anthracene ring, and a phenanthrene ring, and preferred are a benzene ring and a naphthalene ring.

A hydrogen atom on the aromatic ring of $Ar^{B1}$ may be substituted with an alkyl group, an aryl group, an aralkyl group, an alkoxy group, an aryloxy group, or a halogen atom, for example. When the aromatic ring of $Ar^{B1}$ is substituted, the substituent is preferably an alkyl group having 1 or more and 10 or less carbon atoms, an aryl group having 6 or more and 12 or less carbon atoms, or an alkoxy group having 1 or more and 6 or less carbon atoms.

The aromatic ring of $Ar^{B2}$ may be monocyclic or polycyclic. Examples of the aromatic ring include a benzene ring, a naphthalene ring, an anthracene ring, and a phenanthrene ring, and preferred are a benzene ring and a naphthalene ring.

A hydrogen atom on the aromatic ring of $Ar^{B2}$ may be substituted with an alkyl group, an aryl group, an aralkyl group, an alkoxy group, an aryloxy group, or a halogen atom, for example. When the aromatic ring of $Ar^{B2}$ is substituted, the substituent is preferably an alkyl group having 1 or more and 10 or less carbon atoms, an aryl group having 6 or more and 12 or less carbon atoms, or an alkoxy group having 1 or more and 6 or less carbon atoms.

In $Rb^1$ and $Rb^2$, the alkyl group having 1 or more and 20 or less carbon atoms may be linear, branched, or cyclic. The number of carbon atoms of the alkyl group is preferably 1 or more and 18 or less, more preferably 1 or more and 14 or less, still more preferably 1 or more and 10 or less.

In $Rb^1$ and $Rb^2$, the aryl group having 6 or more and 12 or less carbon atoms may be monocyclic or polycyclic. The number of carbon atoms of the aryl group is preferably 6 or more and 10 or less, more preferably 6.

In $Rb^1$ and $Rb^2$, for the aralkyl group having 7 or more and 20 or less carbon atoms, the alkyl group may be linear, branched, or cyclic. For the aralkyl group having 7 or more and 20 or less carbon atoms, the number of carbon atoms of the alkyl group is preferably 1 or more and 4 or less, more preferably 1 or more and 3 or less, still more preferably 1 or 2.

In $Rb^1$ and $Rb^2$, for the aralkyl group having 7 or more and 20 or less carbon atoms, the aryl group may be monocyclic or polycyclic. The number of carbon atoms of the aryl group is preferably 6 or more and 10 or less, more preferably 6.

Of the diol units (B), examples of the diol unit (B) other than the specific diol unit include a diol unit (B4) represented by Formula (B4) below, a diol unit (B7) represented by Formula (B7) below, and a diol unit (B8) represented by Formula (B8) below.

Formula (B4)

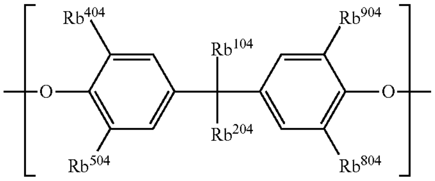

In Formula (B4), $Rb^{104}$ and $Rb^{204}$ are each independently a hydrogen atom or an alkyl group having 1 or more and 3 or less carbon atoms, and $Rb^{404}$, $Rb^{504}$, $Rb^{804}$, and $Rb^{904}$ are each independently a hydrogen atom, an alkyl group having 1 or more and 4 or less carbon atoms, an alkoxy group having 1 or more and 6 or less carbon atoms, or a halogen atom.

In $Rb^{104}$, the alkyl group having 1 or more and 3 or less carbon atoms may be linear, branched, or cyclic. The number of carbon atoms of the alkyl group is preferably 1 or 2, more preferably 1. Specific examples of $Rb^{104}$ include a methyl group, an ethyl group, an n-propyl group, an isopropyl group, and a cyclopropyl group.

Note that specific examples and exemplary examples of $Rb^{204}$, $Rb^{404}$, $Rb^{504}$, $Rb^{804}$, and $Rb^{904}$ are respectively the same as the above-described specific examples and exemplary examples of $Rb^{200}$, $Rb^{400}$, $Rb^{500}$, $Rb^{800}$, and $Rb^{900}$.

Formula (B7)

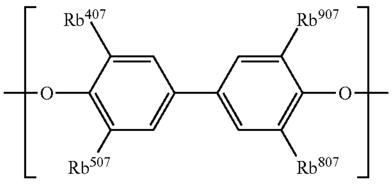

In Formula (B7), $Rb^{407}$, $Rb^{507}$, $Rb^{807}$, and $Rb^{907}$ are each independently a hydrogen atom, an alkyl group having 1 or more and 4 or less carbon atoms, an alkoxy group having 1 or more and 6 or less carbon atoms, or a halogen atom.

Specific examples and exemplary examples of $Rb^{407}$, $Rb^{507}$, $Rb^{807}$, and $Rb^{907}$ are respectively the same as the above-described specific examples and exemplary examples of $Rb^{400}$, $Rb^{500}$, $Rb^{800}$, and $Rb^{900}$.

Formula (B8)

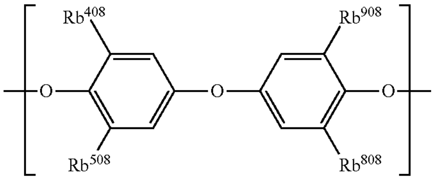

In Formula (B8), $Rb^{408}$, $Rb^{508}$, $Rb^{808}$, and $Rb^{908}$ are each independently a hydrogen atom, an alkyl group having 1 or more and 4 or less carbon atoms, an alkoxy group having 1 or more and 6 or less carbon atoms, or a halogen atom.

Specific examples and exemplary examples of $Rb^{408}$, $Rb^{508}$, $Rb^{808}$, and $Rb^{908}$ are respectively the same as the above-described specific examples and exemplary examples of $Rb^{400}$, $Rb^{500}$, $Rb^{800}$, and $Rb^{900}$.

Hereinafter, as specific examples of the diol unit (B4), diol units (B4-1) to (B4-7) will be described. The diol unit (B4) is not limited to these.

(B4-1)

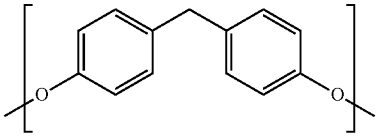

(B4-2)

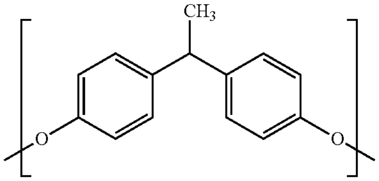

(B4-3)

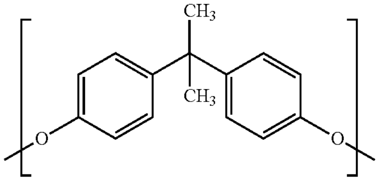

(B4-4)

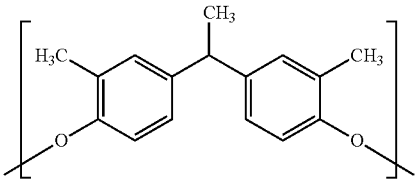

(B4-5)

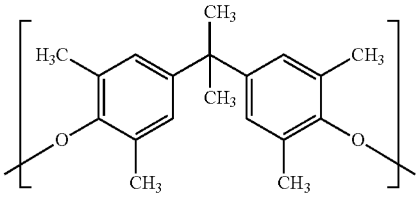

(B4-6)

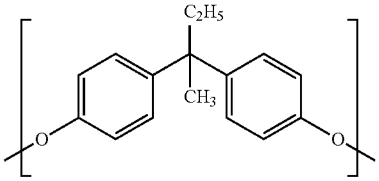

(B4-7)

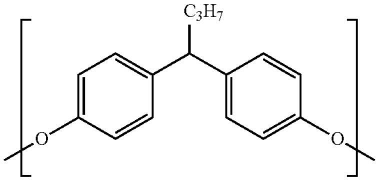

Hereinafter, as specific examples of the diol unit (B7), diol units (B7-1) to (B7-3) will be described. The diol unit (B7) is not limited to these.

(B7-1)

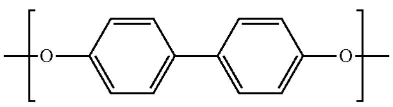

-continued (B7-2)

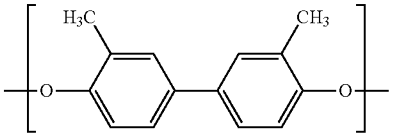

(B7-3)

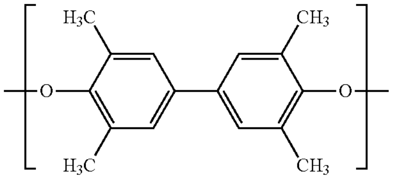

Hereinafter, as specific examples of the diol unit (B8), diol units (B8-1) to (B8-3) will be described. The diol unit (B8) is not limited to these.

(B8-1)

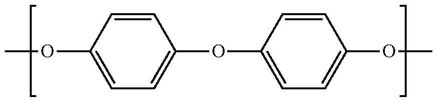

(B8-2)

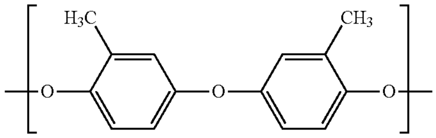

(B8-3)

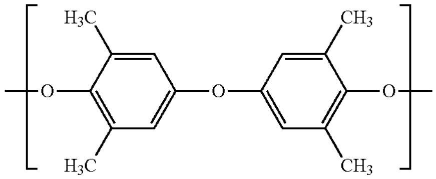

The polyester resin (1) may include a diol unit other than the diol unit (B).

Relative to the whole diol unit of the polyester resin (1), the total mass ratio of the diol unit (B) is, from the viewpoint of improving the wear resistance and the cracking resistance, preferably 80 mass % or more, more preferably 90 mass % or more, still more preferably 95 mass % or more.

Examples of the other diol unit other than the diol unit (B) include aliphatic diol (for example, ethylene glycol, diethylene glycol, triethylene glycol, propylene glycol, butanediol, hexanediol, or neopentyl glycol) units and alicyclic diol (for example, cyclohexanediol, cyclohexanedimethanol, or hydrogenated bisphenol A) units. Of these diol units, one or two or more species may be included in the polyester resin (1).

The polyester resin (1) includes, in addition to the specific diol unit, a unit including a biphenyl skeleton.

When the polyester resin (1) includes the specific diol unit and the unit including a biphenyl skeleton, compared with cases of not including the unit including a biphenyl skeleton, high wear resistance and high cracking resistance may be provided. The reason for this has not been clarified, but is inferred that the compound (T) having entered spaces between molecular chains of the polyester resin (1), the spaces being formed by steric hindrance of the specific diol unit, may tend to be packed with the biphenyl skeleton, and the interaction may increase the strength of the whole charge transport layer.

Relative to the polyester resin (1), the mass ratio of the unit including a biphenyl skeleton is preferably 20 mass % or more and 70 mass % or less.

When the mass ratio of the unit including a biphenyl skeleton is in such a range, compared with cases where it is lower than the range, high cracking resistance may be provided. The reason for this has not been clarified, but is inferred that the probability of packing of the compound (T) with the biphenyl skeleton may be increased, the interaction may tend to occur, and the strength of the whole charge transport layer may be increased. From this viewpoint, the mass ratio of the unit including a biphenyl skeleton is more preferably 30 mass % or more, still more preferably 45 mass % or more.

When the mass ratio of the unit including a biphenyl skeleton is in such a range, compared with cases where it is higher than the range, high solubility in solvents may be provided. From this viewpoint, the mass ratio of the unit including a biphenyl skeleton is more preferably 60 mass % or less, still more preferably 55 mass % or less.

The polyester resin (1) may include, as the diol unit (B), a unit including a biphenyl skeleton and may include, as a dicarboxylic acid unit (A) described later, a unit including a biphenyl skeleton. The polyester resin (1) preferably includes, as the dicarboxylic acid unit (A), the unit including a biphenyl skeleton. In particular, the polyester resin (1) preferably includes a dicarboxylic acid unit (A2) described later.

When the polyester resin (1) includes the dicarboxylic acid unit (A2), higher wear resistance and higher cracking resistance may be provided. The reason for this has not been clarified, but is inferred that, due to the presence of the specific diol unit and the dicarboxylic acid unit (A2) that are alternately disposed, the compound (T) having entered the spaces due to the steric hindrance of the specific diol unit may have a higher probability of being packed with the nearly located biphenyl skeleton of the dicarboxylic acid unit (A2), and the interaction may further increase the strength of the whole charge transport layer.

The polyester resin (1) may include, in addition to the specific diol unit, a dicarboxylic acid unit (A) represented by the following Formula (A).

Formula (A)

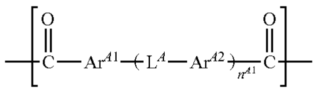

In Formula (A), $Ar^{A1}$ and $Ar^{A2}$ are each independently an optionally substituted aromatic ring. $L^{A}$ is a single bond or a divalent linking group, and $n^{A1}$ is 0, 1, or 2.

For $Ar^{A1}$, the aromatic ring may be monocyclic or polycyclic. Examples of the aromatic ring include a benzene ring, a naphthalene ring, an anthracene ring, and a phenanthrene ring, and preferred are a benzene ring and a naphthalene ring.

For $Ar^{A1}$, a hydrogen atom on the aromatic ring may be substituted with an alkyl group, an aryl group, an aralkyl group, an alkoxy group, an aryloxy group, or a halogen atom, for example. For $Ar^{A1}$, when the aromatic ring is substituted, the substituent is preferably an alkyl group having 1 or more and 10 or less carbon atoms, an aryl group having 6 or more and 12 or less carbon atoms, or an alkoxy group having 1 or more and 6 or less carbon atoms.

For $Ar^{42}$, the aromatic ring may be monocyclic or polycyclic. Examples of the aromatic ring include a benzene ring, a naphthalene ring, an anthracene ring, and a phenanthrene ring, and preferred are a benzene ring and a naphthalene ring.

For $Ar^{42}$, a hydrogen atom on the aromatic ring may be substituted with an alkyl group, an aryl group, an aralkyl group, an alkoxy group, an aryloxy group, or a halogen atom, for example. For $Ar^{42}$, when the aromatic ring is substituted, the substituent is preferably an alkyl group having 1 or more and 10 or less carbon atoms, an aryl group having 6 or more and 12 or less carbon atoms, or an alkoxy group having 1 or more and 6 or less carbon atoms.

When $L^{A}$ is a divalent linking group, examples of the divalent linking group include an oxygen atom, a sulfur atom, and —C($Ra^1$)($Ra^2$)—. These $Ra^1$ and $Ra^2$ are each independently a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be linked together to form a cyclic alkyl group.

In $Ra^1$ and $Ra^2$, the alkyl group having 1 or more and 10 or less carbon atoms may be linear, branched, or cyclic. The number of carbon atoms of the alkyl group is preferably 1 or more and 6 or less, more preferably 1 or more and 4 or less, still more preferably 1 or 2.

In $Ra^1$ and $Ra^2$, the aryl group having 6 or more and 12 or less carbon atoms may be monocyclic or polycyclic. The number of carbon atoms of the aryl group is preferably 6 or more and 10 or less, more preferably 6.

In $Ra^1$ and $Ra^2$, for the aralkyl group having 7 or more and 20 or less carbon atoms, the alkyl group may be linear, branched, or cyclic. For the aralkyl group having 7 or more and 20 or less carbon atoms, the number of carbon atoms of the alkyl group is preferably 1 or more and 4 or less, more preferably 1 or more and 3 or less, still more preferably 1 or 2.

In $Ra^1$ and $Ra^2$, for the aralkyl group having 7 or more and 20 or less carbon atoms, the aryl group may be monocyclic or polycyclic. The number of carbon atoms of the aryl group is preferably 6 or more and 10 or less, more preferably 6.

The dicarboxylic acid unit (A) preferably includes at least one selected from the group consisting of a dicarboxylic acid unit (A1) represented by Formula (A1) below, a dicarboxylic acid unit (A2) represented by Formula (A2) below, a dicarboxylic acid unit (A3) represented by Formula (A3) below, and a dicarboxylic acid unit (A4) represented by Formula (A4) below, more preferably includes the dicarboxylic acid unit (A2).

The polyester (1), particularly from the viewpoint of improving the wear resistance and the cracking resistance, more preferably includes, as the dicarboxylic acid unit (A), at least one selected from the group consisting of the dicarboxylic acid unit (A2) and the dicarboxylic acid unit (A3), still more preferably the dicarboxylic acid unit (A2).

Formula (A1)

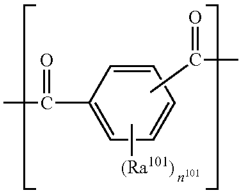

In Formula (A1), $n^{101}$ is an integer of 0 or more and 4 or less, and $n^{101}$ $Ra^{101}$'s are each independently an alkyl group having 1 or more and 10 or less carbon atoms, an aryl group having 6 or more and 12 or less carbon atoms, or an alkoxy group having 1 or more and 6 or less carbon atoms.

$n^{101}$ is preferably 0, 1, or 2, more preferably 0 or 1, still more preferably 0.

Formula (A2)

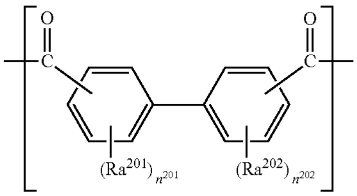

In Formula (A2), $n^{201}$ and $n^{202}$ are each independently an integer of 0 or more and 4 or less, and $n^{201}$ $Ra^{201}$'s and $n^{202}$ $Ra^{202}$'s are each independently an alkyl group having 1 or more and 10 or less carbon atoms, an aryl group having 6 or more and 12 or less carbon atoms, or an alkoxy group having 1 or more and 6 or less carbon atoms.

$n^{201}$ is preferably 0, 1, or 2, more preferably 0 or 1, still more preferably 0.

$n^{202}$ is preferably 0, 1, or 2, more preferably 0 or 1, still more preferably 0.

Formula (A3)

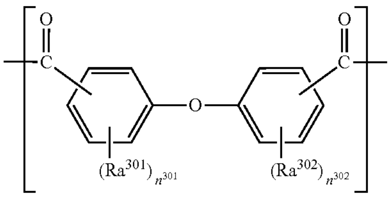

In Formula (A3), $n^{301}$ and $n^{302}$ are each independently an integer of 0 or more and 4 or less, and $n^{301}$ $Ra^{301}$'s and $n^{302}$ $Ra^{302}$'s are each independently an alkyl group having 1 or more and 10 or less carbon atoms, an aryl group having 6 or more and 12 or less carbon atoms, or an alkoxy group having 1 or more and 6 or less carbon atoms.

$n^{301}$ is preferably 0, 1, or 2, more preferably 0 or 1, still more preferably 0.

$n^{302}$ is preferably 0, 1, or 2, more preferably 0 or 1, still more preferably 0.

Formula (A4)

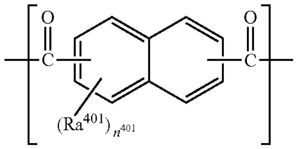

In Formula (A4), $n^{401}$ is an integer of 0 or more and 6 or less, and $n^{401}$ $Ra^{401}$'s are each independently an alkyl group having 1 or more and 10 or less carbon atoms, an aryl group having 6 or more and 12 or less carbon atoms, or an alkoxy group having 1 or more and 6 or less carbon atoms.

$n^{401}$ is preferably an integer of 0 or more and 4 or less, more preferably 0, 1, or 2, still more preferably 0.

$Ra^{101}$ in Formula (A1), $Ra^{201}$ and $Ra^{202}$ in Formula (A2), $Ra^{301}$ and $Ra^{302}$ in Formula (A3), and $Ra^{401}$ in Formula (A4) share specific examples and exemplary examples and hence hereinafter $Ra^{101}$, $Ra^{201}$, $Ra^{202}$, $Ra^{301}$, $Ra^{302}$, and $Ra^{401}$ will be collectively described as "Ra".

In Ra, the alkyl group having 1 or more and 10 or less carbon atoms may be linear, branched, or cyclic. The number of carbon atoms of the alkyl group is preferably 1 or more and 6 or less, more preferably 1 or more and 4 or less, still more preferably 1 or 2.

Examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spiro-ring) alkyl groups in which such monocyclic alkyl groups are linked together.

For Ra, the aryl group having 6 or more and 12 or less carbon atoms may be monocyclic or polycyclic. The number of carbon atoms of the aryl group is preferably 6 or more and 10 or less, more preferably 6.

Examples of the aryl group having 6 or more and 12 or less carbon atoms include a phenyl group, a biphenyl group, a 1-naphthyl group, and a 2-naphthyl group.

In Ra, for the alkoxy group having 1 or more and 6 or less carbon atoms, the alkyl group may be linear, branched, or cyclic. For the alkoxy group having 1 or more and 6 or less carbon atoms, the number of carbon atoms of the alkyl group is preferably 1 or more and 4 or less, more preferably 1 or more and 3 or less, still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Hereinafter, as specific examples of the dicarboxylic acid unit (A1), dicarboxylic acid units (A1-1) to (A1-9) will be described. The dicarboxylic acid unit (A1) is not limited to these.

(A1-1)

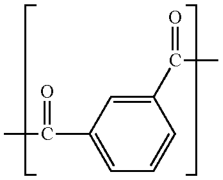

(A1-2)

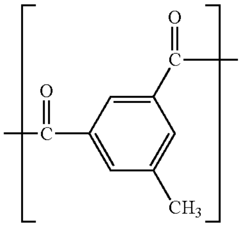

(A1-3)

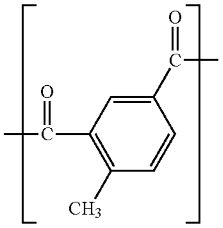

(A1-4)

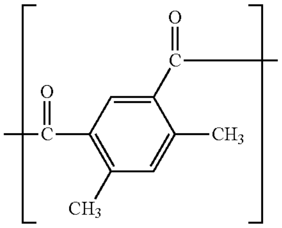

(A1-5)

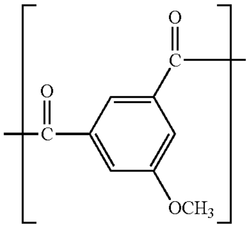

(A1-6)

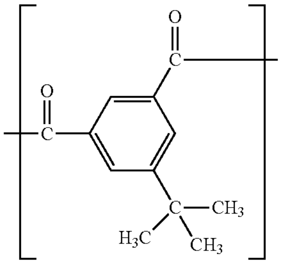

(A1-7)

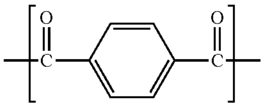

-continued (A1-8)

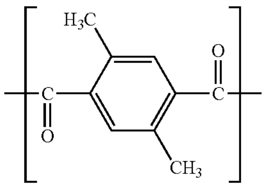

(A1-9)

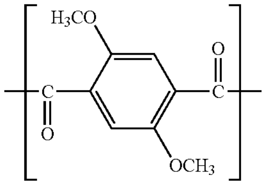

Hereinafter, as specific examples of the dicarboxylic acid unit (A2), dicarboxylic acid units (A2-1) to (A2-3) will be described. The dicarboxylic acid unit (A2) is not limited to these.

(A2-1)

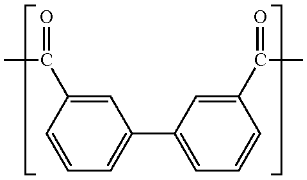

(A2-2)

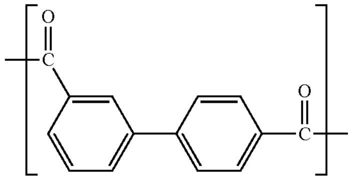

(A2-3)

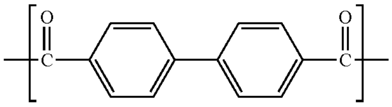

Hereinafter, as specific examples of the dicarboxylic acid unit (A3), dicarboxylic acid units (A3-1) to (A3-2) will be described. The dicarboxylic acid unit (A3) is not limited to these.

(A3-1)

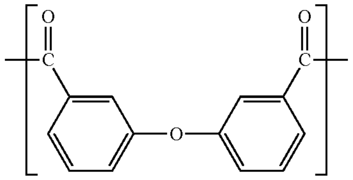

(A3-2)

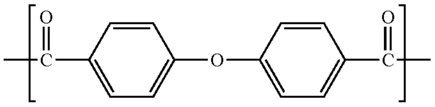

Hereinafter, as specific examples of the dicarboxylic acid unit (A4), dicarboxylic acid units (A4-1) to (A4-3) will be described. The dicarboxylic acid unit (A4) is not limited to these.

(A4-1)

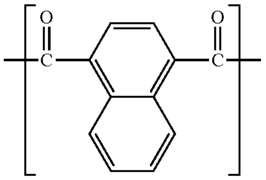

(A4-2)

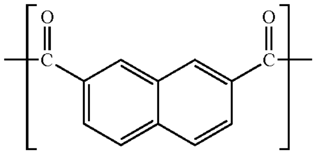

(A4-3)

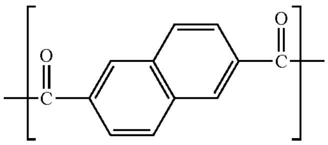

The polyester resin (1) preferably includes, as the dicarboxylic acid unit (A), at least one selected from the group consisting of the specific examples (A1-1), (A1-7), (A2-3), (A3-2), and (A4-3), more preferably at least one selected from the group consisting of (A2-3), (A3-2), and (A4-3), still more preferably at least (A2-3).

Relative to the polyester resin (1), the total mass ratio of the dicarboxylic acid units (A1) to (A4) is preferably 15 mass % or more and 60 mass % or less.

When the total mass ratio of the dicarboxylic acid units (A1) to (A4) is 15 mass % or more, the photosensitive layer may have high wear resistance. From this viewpoint, the total mass ratio of the dicarboxylic acid units (A1) to (A4) is more preferably 20 mass % or more, still more preferably 25 mass % or more.

When the total mass ratio of the dicarboxylic acid units (A1) to (A4) is 60 mass % or less, separation of the photosensitive layer may be suppressed. From this viewpoint, the total mass ratio of the dicarboxylic acid units (A1) to (A4) is more preferably 55 mass % or less, still more preferably 50 mass % or less.

The polyester resin (1) may include one or two or more species among the dicarboxylic acid units (A1) to (A4).

Examples of another dicarboxylic acid unit (A) other than the dicarboxylic acid units (A1) to (A4) include aliphatic dicarboxylic acid (such as oxalic acid, malonic acid, maleic acid, fumaric acid, citraconic acid, itaconic acid, glutaconic acid, succinic acid, alkenyl succinic acid, adipic acid, or sebacic acid) units, alicyclic dicarboxylic acid (such as cyclohexane dicarboxylic acid) units, and lower (such as 1 or more and 5 or less carbon atoms) alkyl ester units of the foregoing. The polyester resin (1) may include, of these dicarboxylic acid units, one or two or more species.

Examples of the end groups of the polyester resin (1) include, in addition to the hydrogen atom bonded to the diol unit and the hydroxy group bonded to the dicarboxylic acid unit, groups derived from an end capping agent or molecular weight modifier used during production.

Examples of the end capping agent or molecular weight modifier include monohydric phenols, monovalent acid chlorides, monohydric alcohols, and monocarboxylic acids.

Examples of the monohydric phenols include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, 2,6-dimethylphenol derivative, 2-methylphenol derivative, o-phenylphenol, m-phenylphenol, p-phenylphenol, o-methoxyphenol, m-methoxyphenol, p-methoxyphenol, 2,3,5-trimethylphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl)propane, 2-phenyl-2-(2-hydroxyphenyl)propane, and 2-phenyl-2-(3-hydroxyphenyl)propane.

Examples of the monovalent acid chlorides include monofunctional acid halides such as benzoyl chloride, benzoic chloride, methanesulfonyl chloride, phenylchloroformate, acetic chloride, butyric chloride, octylic chloride, benzenesulfonyl chloride, benzenesulfinyl chloride, sulfinyl chloride, benzenephosphonyl chloride, and substitution products of the foregoing.

Examples of the monohydric alcohols include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monocarboxylic acids include acetic acid, propionic acid, octanoic acid, cyclohexanecarboxylic acid, benzoic acid, toluic acid, phenylacetic acid, p-tert-butylbenzoic acid, and p-methoxyphenylacetic acid.

As described above, end groups of the polyester resin (1) do not include fluorine atoms. When the end groups of the polyester resin (1) do not include fluorine atoms, higher wear resistance and higher cracking resistance may be provided. End groups including the fluorine element tend to cause further entanglement of molecular chains of the resin and may cause susceptibility to shearing stress; thus, when the end groups do not include fluorine atoms, compared with cases where the end groups include fluorine atoms, high wear resistance and high cracking resistance may be provided inferentially.

The polyester resin (1) may not include fluorine atoms from the viewpoint of improving the wear resistance and the cracking resistance. The reason why the polyester resin (1) not including fluorine atoms may provide higher wear resistance and higher cracking resistance has not been clarified, but is inferred that molecular chains of the resin are more movable.

The polyester resin (1) has a weight-average molecular weight of preferably 30,000 or more and 300,000 or less, more preferably 40,000 or more and 250,000 or less, still more preferably 50,000 or more and 200,000 or less.

The molecular weight of the polyester resin (1) is the polystyrene-equivalent molecular weight measured by GPC (gel permeation chromatography). In GPC, tetrahydrofuran is used as the eluent.

The polyester resin (1) can be obtained by, for example, subjecting a monomer that provides the dicarboxylic acid unit (A), a monomer that provides the diol unit (B), and optionally another monomer to polycondensation by standard procedures. Examples of the polycondensation method for the monomers include an interfacial polymerization method, a solution polymerization method, and a melt polymerization method. The interfacial polymerization method is a polymerization method in which a dicarboxylic halide dissolved in an organic solvent incompatible with water is mixed with a dihydric alcohol dissolved in an alkaline aqueous solution to thereby obtain a polyester. Examples of literature concerning the interfacial polymerization method include W. M. EARECKSON, J. Poly. Sci., XL399, 1959 and Japanese Examined Patent Application Publication No. 40-1959. The interfacial polymerization method causes a faster reaction than the solution polymerization method, so that hydrolysis of the dicarboxylic halide can be suppressed, which may result in a polyester resin having a high molecular weight.

Compound (T)

The charge transport layer contains the compound (T) represented by the following Formula (T).

$$Ar^{T1}\text{-}L^{T1}\text{-}Ar^{T2} \qquad \text{Formula (T)}$$

In Formula (T), $Ar^{T1}$ is an optionally substituted naphthyl group or an optionally substituted biphenyl group, $L^{T1}$ is a single bond or an ether bond, and $Ar^{T2}$ is an optionally substituted aryl group having 6 or more and 12 or less carbon atoms or an optionally substituted aralkyl group having 7 or more and 20 or less carbon atoms.

Examples of the naphthyl group represented by $Ar^{T1}$ include a 1-naphthyl group and a 2-naphthyl group. Examples of the biphenyl group represented by $Ar^{T1}$ include an o-biphenyl group, a m-biphenyl group, and a p-biphenyl group.

The substituent that $Ar^{T1}$ may have may be an alkyl group having 1 or more and 4 or less carbon atoms. When $Ar^{T1}$ has a substituent, of such groups, the substituent is, from the viewpoint of improving the cracking resistance, preferably an alkyl group having 1 or more and 3 or less carbon atoms, more preferably an alkyl group having 1 or more and 2 or less carbon atoms, still more preferably a methyl group. The number of substituents of $Ar^{T1}$ is, for example, 0 or more and 7 or less, from the viewpoint of improving the cracking resistance, preferably 0 or more and 3 or less, more preferably 0 or more and 1 or less, still more preferably 0.

The aryl group represented by $Ar^{T2}$ and having 6 or more and 12 or less carbon atoms may be monocyclic or polycyclic. The number of carbon atoms of the aryl group is preferably 6 or more and 10 or less, more preferably 6. Examples of the aryl group having 6 or more and 12 or less carbon atoms include a phenyl group, an o-biphenyl group, a m-biphenyl group, a p-biphenyl group, a 1-naphthyl group, and a 2-naphthyl group.

For the aralkyl group represented by $Ar^{T2}$ and having 7 or more and 20 or less carbon atoms, the alkyl group may be linear, branched, or cyclic. For the aralkyl group having 7 or more and 20 or less carbon atoms, the number of carbon atoms of the alkyl group is preferably 1 or more and 4 or less, more preferably 1 or more and 3 or less, still more preferably 1 or 2, particularly preferably 1. For the aralkyl group having 7 or more and 20 or less carbon atoms, the aryl group may be monocyclic or polycyclic. The number of carbon atoms of the aryl group is preferably 6 or more and 10 or less, more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

The substituent that $Ar^{T2}$ may have may be an alkyl group having 1 or more and 4 or less carbon atoms. When $Ar^{T2}$ has a substituent, of such groups, the substituent is, from the viewpoint of improving the cracking resistance, preferably an alkyl group having 1 or more and 3 or less carbon atoms, more preferably an alkyl group having 1 or more and 2 or less carbon atoms, still more preferably a methyl group. The number of substituents that $Ar^{T2}$ has is, for example, 0 or more and 5 or less, from the viewpoint of improving the cracking resistance, preferably 0 or more and 3 or less, more preferably 0 or more and 1 or less, still more preferably 0.

The compound (T) may include at least one selected from the group consisting of a compound (T1) represented by Formula (T1) below, a compound (T2) represented by Formula (T2) below, and a compound (T3) represented by Formula (T3) below.

Formula (T1)

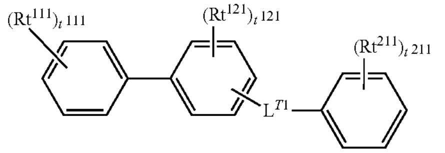

Formula (T2)

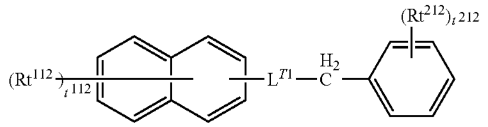

Formula (T3)

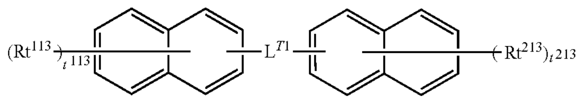

In Formula (T1), $t^{111}$ and $t^{211}$ are each independently an integer of 0 or more and 5 or less, $t^{121}$ is an integer of 0 or more and 4 or less, $t^{111}$ $Rt^{111}$'s, $t^{121}$ $Rt^{121}$'s, and $t^{211}$ $Rt^{211}$'s are each independently an alkyl group having 1 or more and 4 or less carbon atoms, and $L^{T1}$ is a single bond or an ether bond.

$t^{111}$ is preferably 0, 1, or 2, more preferably 0 or 1, still more preferably 0.

$t^{121}$ is preferably 0, 1, or 2, more preferably 0 or 1, still more preferably 0.

$t^{211}$ is preferably 0, 1, or 2, more preferably 0 or 1, still more preferably 0.

$L^{T1}$ is preferably a single bond.

Note that the bonding position of $L^{T1}$ for the biphenyl group may be the ortho position, the meta position, or the para position, is preferably the meta position or the para position, more preferably the meta position.

In Formula (T2), $t^{112}$ is an integer of 0 or more and 6 or less, $t^{212}$ is an integer of 0 or more and 5 or less, $t^{112}$ $Rt^{112}$'s and $t^{212}$ $Rt^{212}$'s are each independently an alkyl group having 1 or more and 4 or less carbon atoms, and $L^{T1}$ is a single bond or an ether bond.

$t^{112}$ is preferably 0, 1, or 2, more preferably 0 or 1, still more preferably 0.

$t^{212}$ is preferably 0, 1, or 2, more preferably 0 or 1, still more preferably 0.

$L^{T1}$ is preferably an ether bond.

Note that the bonding position of $L^{T1}$ for the naphthyl group may be the 1 position or the 2 position, and is preferably the position 2.

In Formula (T3), $t^{113}$ and $t^{213}$ are each independently an integer of 0 or more and 6 or less, $t^{113}$ $Rt^{113}$'s and $t^{213}$ $Rt^{213}$'s are each independently an alkyl group having 1 or more and 4 or less carbon atoms, and $L^{T1}$ is a single bond or an ether bond.

$t^{113}$ is preferably 0, 1, or 2, more preferably 0 or 1, still more preferably 0.

$t^{213}$ is preferably 0, 1, or 2, more preferably 0 or 1, still more preferably 0.

$L^{T1}$ is preferably an ether bond.

Note that the bonding positions of $L^{T1}$ for the two naphthyl groups may each independently be the 1 position or the 2 position, and are preferably the positions 2.

Hereinafter, as specific examples of the compound (T1), compounds (T1-1) to (T1-3) will be described. The compound (T1) is not limited to these.

(T1-1)

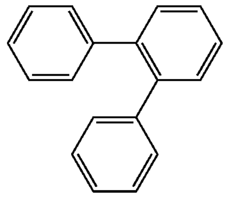

(T1-2)

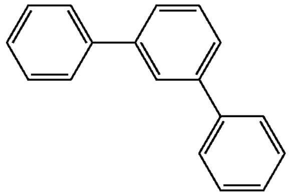

(T1-3)

Hereinafter, as specific examples of the compound (T2), compounds (T2-1) and (T2-2) will be described. The compound (T2) is not limited to these.

(T2-1)

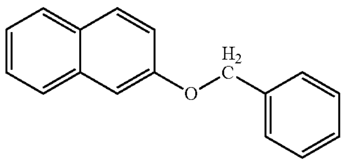

(T2-2)

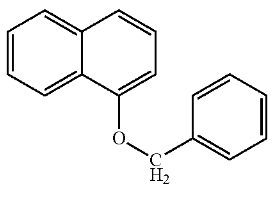

Hereinafter, as specific examples of the compound (T3), compounds (T3-1) to (T3-3) will be described. The compound (T3) is not limited to these.

(T3-1)

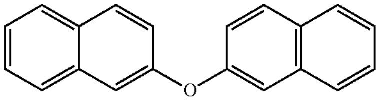

(T3-2)

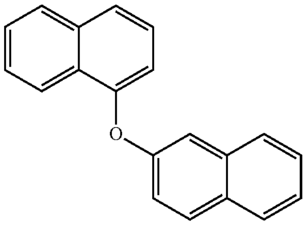

(T3-3)

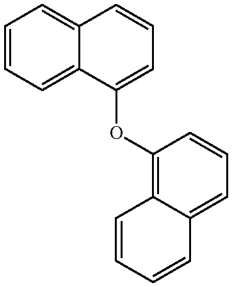

The charge transport layer may contain a single compound (T) species alone or two or more compound (T) species.

Relative to 100 parts by mass of the polyester resin, the compound (T) content is preferably 1 part by mass or more and 20 parts by mass or less.

Relative to 100 parts by mass of the polyester resin, when the compound (T) content is in such a range, compared with cases where it is lower than the range, high wear resistance and high cracking resistance may be provided. The reason for this has not been clarified, but is inferred that, when the compound (T) content is equal to or higher than the lower limit value, the interaction between the polyester resin (1) and the compound (T) may tend to provide the effect of increasing the strength of the whole charge transport layer. From this viewpoint, relative to 100 parts by mass of the polyester resin, the compound (T) content is more preferably 4 parts by mass or more, or may be 10 parts by mass or more.

Relative to 100 parts by mass of the polyester resin, when the compound (T) content is in such a range, compared with cases where it is higher than the range, high wear resistance and high cracking resistance may be provided. The reason for this has not been clarified, but is inferred that degradation of the wear resistance and degradation of the cracking resistance due to an excessively low resin content in the film may be suppressed. From this viewpoint, relative to 100 parts by mass of the polyester resin, the compound (T) content is more preferably 20 parts by mass or less, still more preferably 15 parts by mass or less, particularly preferably 10 parts by mass or less.

Conductive Base Body

Examples of the conductive base body include metal plates, metal drums, and metal belts containing a metal (such as aluminum, copper, zinc, chromium, nickel, molybdenum, vanadium, indium, gold, or platinum) or an alloy (such as stainless steel). Other examples of the conductive base body include papers, resin films, and belts coated with, vapor-deposited with, or laminated with a conductive compound (such as a conductive polymer or indium oxide), a metal (such as aluminum, palladium, or gold), or an alloy. The term "conductive" used here means having a volume resistivity of less than $10^{13}$ Ω2 cm.

When the electrophotographic photoreceptor is used for a laser printer, for the purpose of suppressing interference fringes generated during irradiation with the laser beam, the surface of the conductive base body may be roughened to a center line average roughness Ra of 0.04 μm or more and 0.5 μm or less. Note that, in the case of using incoherent light as the light source, roughening of the surface for suppressing interference fringes is not necessarily performed, but may suppress generation of defects due to surface irregularities of the conductive base body, which may provide longer service life.

Examples of the surface roughening method include wet honing of spraying an abrasive suspended in water, to the conductive base body, centerless grinding of pressing the conductive base body to a rotating grindstone to continuously perform grinding, and anodic oxidation process.

Another example of the surface roughening method is a method in which, without roughening the surface of the conductive base body, a conductive or semiconductive powder is dispersed in a resin and used to form a layer on the surface of the conductive base body, and the particles dispersed in the layer are used to achieve surface roughening.

In the surface-roughening process by anodic oxidation, a conductive base body formed of a metal (such as aluminum) is used as the anode and anodic oxidation is performed in an electrolyte solution to thereby form an oxidation film in the surface of the conductive base body. Examples of the electrolyte solution include a sulfuric acid solution and an oxalic acid solution. However, the porous anodic oxidation film formed by anodic oxidation is itself chemically active, easily contaminated, and undergoes considerable changes in the resistivity in response to environments. Thus, for the porous anodic oxidation film, a sealing process can be performed so that a hydration reaction is caused in pressurized steam or boiling water (to which a salt of a metal such as nickel may be added) to cause volume expansion to seal fine pores of the oxidation film and to change the oxidation film into a more stable hydrated oxide.

The anodic oxidation film may have a film thickness of, for example, 0.3 μm or more and 15 μm or less. When the film thickness is in this range, the film may tend to exhibit barrier performance against injection and may tend to suppress the increase in the residual potential due to repeated use.

The conductive base body may be subjected to a process using an acidic process liquid or a boehmite process.

The process using an acidic process liquid is performed, for example, in the following manner. An acidic process liquid containing phosphoric acid, chromic acid, and hydrofluoric acid is prepared. In the acidic process liquid, the mixing proportions of phosphoric acid, chromic acid, and hydrofluoric acid may be, for example, 10 mass % or more and 11 mass % or less of phosphoric acid, 3 mass % or more and 5 mass % or less of chromic acid, and 0.5 mass % or more and 2 mass % or less of hydrofluoric acid, and the total concentration of these acids may be 13.5 mass % or more and 18 mass % or less. The process temperature may be, for example, 42° C. or more and 48° C. or less. The cover film may have a film thickness of 0.3 μm or more and 15 μm or less.

The boehmite process is performed by, for example, immersion in pure water at 90° C. or more and 100° C. or less for 5 minutes to 60 minutes or contact with heated steam at 90° C. or more and 120° C. or less for 5 minutes to 60 minutes. The cover film may have a film thickness of 0.1 μm or more and 5 μm or less. The cover film may be further subjected to an anodic oxidation process using an electrolyte solution having a low dissolving power for the cover film, such as adipic acid, boric acid, borate, phosphate, phthalate, maleate, benzoate, tartrate, or citrate.

Undercoat Layer

The undercoat layer is, for example, a layer including inorganic particles and a binder resin.

Examples of the inorganic particles include inorganic particles having a powder resistivity (volume resistivity) of $10^2$ Ωcm or more and $10^{11}$ Ωcm or less.

Of these, inorganic particles having such a resistivity may be, for example, metal oxide particles such as tin oxide particles, titanium oxide particles, zinc oxide particles, and zirconium oxide particles, and are particularly preferably zinc oxide particles.

The inorganic particles may have a specific surface area of, for example, 10 $m^2/g$ or more measured by the BET method.

The inorganic particles may have a volume-average particle size of, for example, 50 nm or more and 2000 nm or less (preferably 60 nm or more and 1000 nm or less).

The inorganic particle content is, for example, relative to the binder resin, preferably 10 mass % or more and 80 mass % or less, more preferably 40 mass % or more and 80 mass % or less.

The inorganic particles may be surface-treated. As the inorganic particles, a mixture of two or more inorganic particle species different in surface treatment or two or more inorganic particle species different in particle size may be used.

Examples of the surface treatment agent include silane coupling agents, titanate-based coupling agents, aluminum-based coupling agents, and surfactants. In particular, preferred are silane coupling agents and more preferred are silane coupling agents including an amino group.

Non-limiting examples of the silane coupling agents including an amino group include 3-aminopropyltriethoxysilane, N-2-(aminocthyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

For the silane coupling agents, a mixture of two or more may be used. For example, a silane coupling agent having an amino group and another silane coupling agent may be used in combination. Non-limiting examples of the other silane coupling agent include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminocthyl)-3-aminopropylmethyldimethoxysilane, N,N-bis(2-hydroxyethyl)-3-aminopropyltriethoxysilane, and 3-chloropropyltrimethoxysilane.

The surface treatment method using a surface treatment agent may be any publicly known method and may be a dry method or a wet method.

The amount of surface treatment agent applied may be, for example, relative to the inorganic particles, 0.5 mass % or more and 10 mass % or less.

The undercoat layer may contain, in addition to the inorganic particles, an electron acceptor compound (acceptor compound) from the viewpoint of improving the long term stability of electrical characteristics and carrier blocking performance.

Examples of the electron acceptor compound include electron transport substances such as quinone-based compounds such as chloranil and bromoanil; tetracyanoquinodimethane-based compounds; fluorenone compounds such as 2,4,7-trinitrofluorenone and 2,4,5,7-tetranitro-9-fluorenone; oxadiazole-based compounds such as 2-(4-biphenyl)-5-(4-t-butylphenyl)-1,3,4-oxadiazole, 2,5-bis(4-naphthyl)-1,3,4-oxadiazole, and 2,5-bis(4-dicthylaminophenyl)-1,3,4-oxadiazole; xanthone-based compounds; thiophene compounds; and diphenoquinone compounds such as 3,3',5,5'-tetra-t-butyldiphenoquinone.

In particular, the electron acceptor compound is preferably a compound having an anthraquinone structure. Preferred examples of the compound having an anthraquinone structure include hydroxyanthraquinone compounds, aminoanthraquinone compounds, and aminohydroxyanthraquinone compounds, and specific preferred examples include anthraquinone, alizarin, quinizarin, anthrarufin, and purpurin.

The electron acceptor compound may be included, in the undercoat layer, in a state of being dispersed together with the inorganic particles or in a state of adhering to the surfaces of the inorganic particles.

Examples of the method of causing the electron acceptor compound to adhere to the surfaces of the inorganic particles include a dry method and a wet method.

In the dry method, for example, to the inorganic particles being stirred in, for example, a mixer having a high shearing force, the electron acceptor compound itself or dissolved in an organic solvent is added dropwise or sprayed together with dry air or nitrogen gas, to cause the electron acceptor compound to adhere to the surfaces of the inorganic particles. Dropwise addition or spraying of the electron acceptor compound may be performed at a temperature of equal to or lower than the boiling point of the solvent. After dropwise addition or spraying of the electron acceptor compound, baking at 100° C. or higher may be further performed. The baking is not particularly limited as long as it is performed at a temperature for a time to provide electrophotographic characteristics.

In the wet method, for example, to the inorganic particles being dispersed in a solvent by, for example, a stirrer, ultrasonic waves, a sand mill, an attritor, or a ball mill, the electron acceptor compound is added and stirred or dispersed, and subsequently the solvent is removed, to cause the electron acceptor compound to adhere to the surfaces of the inorganic particles. The solvent is removed by, for example, filtration or distillation. After removal of the solvent, baking at 100° C. or higher may be further performed. The baking is not particularly limited as long as it is performed at a temperature for a time to provide electrophotographic characteristics. In the wet method, before the addition of the electron acceptor compound, water contained in the inorganic particles may be removed; this may be performed by, for example, a method of removing the water from the inorganic particles being stirred and heated in the solvent or a method of removing the water from an azeotrope of the inorganic particles and the solvent.

Note that the adhesion of the electron acceptor compound may be performed before or after the surface treatment of the inorganic particles using the surface treatment agent; alternatively, the adhesion of the electron acceptor compound and the surface treatment using the surface treatment agent may be performed simultaneously.

The electron acceptor compound content may be, for example, relative to the inorganic particles, 0.01 mass % or more and 20 mass % or less, and is preferably 0.01 mass % or more and 10 mass % or less.

Examples of the binder resin used for the undercoat layer include publicly known polymer compounds such as acetal resins (such as polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenol resins, phenol-formaldehyde resins, melamine resins, urethane resins, alkyd resins, and epoxy resins; and publicly known materials such as zirconium chelate compounds; titanium chelate compounds; aluminum chelate compounds; titanium alkoxide compounds; organic titanium compounds; and silane coupling agents.

Other examples of the binder resin used for the undercoat layer include charge transport resins including charge transport groups and conductive resins (such as polyaniline).

Of these, the binder resin used for the undercoat layer is preferably resins insoluble in coating solvents of the overlying layer; in particular, preferred are thermosetting resins such as urea resins, phenol resins, phenol-formaldehyde resins, melamine resins, urethane resins, unsaturated polyester resins, alkyd resins, and epoxy resins and resins obtained by a reaction between a curing agent and at least one resin selected from the group consisting of polyamide resins, polyester resins, polyether resins, methacrylic resins, acrylic resin, polyvinyl alcohol resins, and polyvinyl acetal resins.

When two or more of such binder resins are used in combination, the mixing ratio thereof is appropriately set.

The undercoat layer may include various additives for improving electrical characteristics, improving the environmental stability, or improving the image quality.

Examples of the additives include publicly known materials including electron transport pigments such as polycyclic, condensed ring-based pigments and azo-based pigments, zirconium chelate compounds, titanium chelate compounds, aluminum chelate compounds, titanium alkoxide compounds, organic titanium compounds, and silane coupling agents. As described above, such a silane coupling agent is used for the surface treatment of the inorganic particles, but may be further added, as an additive, to the undercoat layer.

Examples of the silane coupling agents serving as the additives include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminocthyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compounds include zirconium butoxide, zirconium ethylacetoacetate, zirconium triethanolamine, acetylacetonato zirconium butoxide, ethylacetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compounds include tetraisopropyl titanate, tetra-n-butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, and polyhydroxy titanium stearate.

Examples of the aluminum chelate compounds include aluminum isopropylate, monobutoxyaluminum diisopropylate, aluminum butyrate, diethyl acetoacetato aluminum diisopropylate, and aluminum tris(ethylacetoacetate).

Such additives may be used alone or as a mixture or polycondensate of plural compounds.

The undercoat layer may have a Vickers hardness of 35 or more.

The surface roughness (ten point height of roughness profile) of the undercoat layer may be adjusted to, for the purpose of suppressing moiré fringes, 1/(4n) (n is the refractive index of the overlying layer) to ½ of the wavelength $\lambda$ of the laser used for exposure.

In order to adjust the surface roughness, for example, resin particles may be added to the undercoat layer. Examples of the resin particles include silicone resin particles and crosslinked polymethyl methacrylate resin particles. Alternatively, in order to adjust the surface roughness, the surface of the undercoat layer may be polished. Examples of the polishing method include buffing, sandblasting, wet honing, and grinding.

Formation of the undercoat layer is not particularly limited and may be performed by a well-known formation method; for example, an undercoat layer-forming coating liquid prepared by adding the above-described components to a solvent is used to form a coating film and the coating film is dried and optionally heated.

Examples of the solvent used for preparing the undercoat layer-forming coating liquid include publicly known organic solvents such as alcohol-based solvents, aromatic hydrocarbon solvents, halogenated hydrocarbon solvents, ketone-based solvents, ketone alcohol-based solvents, ether-based solvents, and ester-based solvents.

Specific examples of the solvents include ordinary organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

In the preparation of the undercoat layer-forming coating liquid, examples of the method of dispersing the inorganic particles include publicly known methods such as use of a roll mill, a ball mill, a vibration ball mill, an attritor, a sand mill, a colloid mill, or a paint shaker.

Examples of the method of applying the undercoat layer-forming coating liquid onto the conductive base body include ordinary methods such as a blade coating method, a wire bar coating method, a spray coating method, a dip coating method, a bead coating method, an air knife coating method, and a curtain coating method.

The undercoat layer is formed so as to have a thickness of, for example, preferably 15 μm or more, more preferably 20 μm or more and 50 μm or less.

Intermediate Layer

An intermediate layer (not shown) may be further disposed between the undercoat layer and the photosensitive layer.

The intermediate layer is, for example, a layer containing a resin. Examples of the resin used for the intermediate layer include polymer compounds such as acetal resins (such as polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may be a layer containing an organometallic compound. Examples of the organometallic compound used for the intermediate layer include organometallic compounds containing metallic atoms such as zirconium, titanium, aluminum, manganese, or silicon.

Such compounds used for the intermediate layer may be used alone or as a mixture or polycondensate of plural compounds.

Of these, the intermediate layer preferably contains an organometallic compound containing a zirconium atom or a silicon atom.

Formation of the intermediate layer is not particularly limited and may be performed by a well-known formation method; for example, an intermediate layer-forming coating liquid prepared by adding the above-described components to a solvent is used to form a coating film and the coating film is dried and optionally heated.

Examples of the coating method for forming the intermediate layer include ordinary methods such as a dip coating method, a push-up coating method, a wire bar coating method, a spray coating method, a blade coating method, an air knife coating method, and a curtain coating method.

The intermediate layer is formed so as to have a thickness of, for example, preferably 0.1 μm or more and 3 μm or less. Note that the intermediate layer may be used as the undercoat layer.

Charge Generation Layer

The charge generation layer is, for example, a layer containing a charge generation material and a binder resin. The charge generation layer may be a vapor deposition layer of the charge generation material. The vapor deposition layer of the charge generation material may be used in the case of using an incoherent light source such as an LED (Light Emitting Diode) or an organic EL (Electro-Luminescence) image array.

Examples of the charge generation material include azo pigments such as bisazo pigments and trisazo pigments; condensed aromatic ring pigments such as dibromoanthanthrone; perylene pigments; pyrrolopyrrole pigments; phthalocyanine pigments; zinc oxide; and trigonal selenium.

Of these, in the case of near-infrared laser exposure, the charge generation material is preferably a metal phthalocyanine pigment or a metal-free phthalocyanine pigment. Specifically, more preferred examples include hydroxygallium phthalocyanine; chlorogallium phthalocyanine; dichlorotin phthalocyanine; and titanyl phthalocyaninc.

On the other hand, in the case of near-UV laser exposure, preferred examples of the charge generation material include condensed aromatic ring pigments such as dibromoanthanthrone; thioindigo-based pigments; porphyrazine compounds; zinc oxide; trigonal selenium; and bisazo pigments.

Also in the case of using an incoherent light source such as an LED or organic EL image array having a central emission wavelength in 450 nm or more and 780 nm or less, the above-described charge generation material may be used; however, from the viewpoint of resolution, in the case of using, as the photosensitive layer, a thin film having a thickness of 20 μm or less, the photosensitive layer has an increased electric field strength, which tends to result in a decrease in the charging due to charge injection from the base body and an image defect, what is called, black dots. This is noticeable in the case of using a charge generation material that is a p-type semiconductor and tends to cause dark current, such as trigonal selenium or a phthalocyanine pigment.

By contrast, in the case of using, as the charge generation material, an n-type semiconductor such as a condensed aromatic ring pigment, a perylene pigment, or an azo pigment, dark current may tend not to occur and, even in the case of a thin film, the image defect referred to as black dots may be suppressed.

Note that whether or not a charge generation material is an n-type is determined by the ordinarily used time-of-flight method, on the basis of the polarity of the photocurrent flowing; charge generation materials that tend to cause electrons to flow as carriers, compared with holes, are determined as the n-type.

The binder resin used for the charge generation layer may be selected from wide-ranging insulating resins; the binder resin may be selected from organic photoconductive polymers such as poly-N-vinylcarbazole, polyvinyl anthracene, polyvinyl pyrene, and polysilane.

Examples of the binder resin include polyvinyl butyral resins, polyarylate resins (such as polycondensates between a bisphenol and an aromatic dicarboxylic acid), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinyl pyrrolidone resins. The term "insulating" used here means having a volume resistivity of $10^{13}$ Ωcm or more.

Such binder resins are used alone or as a mixture of two or more thereof.

Note that the mixing ratio of the charge generation material to the binder resin may be a mass ratio in the range of 10:1 to 1:10.

The charge generation layer may further contain another well-known additive.

Formation of the charge generation layer is not particularly limited and may be performed by a well-known formation method. For example, a charge generation layer-forming coating liquid prepared by adding the above-described components to a solvent is used to form a coating film and the coating film is dried and optionally heated. Note that the charge generation layer may alternatively be formed by vapor deposition of the charge generation material. The formation of the charge generation layer by vapor deposition may be employed, in particular, in the case of using, as the charge generation material, a condensed aromatic ring pigment or a perylene pigment.

Examples of the solvent used for preparing the charge generation layer-forming coating liquid include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. Such solvents are used alone or as a mixture of two or more thereof.

Examples of the method of dispersing, in the charge generation layer-forming coating liquid, particles (such as the charge generation material) include use of a media dispersing machine such as a ball mill, a vibration ball mill, an attritor, a sand mill, or a horizontal sand mill and use of a media-less dispersing machine such as a stirrer, an ultrasonic dispersing machine, a roll mill, or a high-pressure homogenizer. Examples of the high-pressure homogenizer include a collision-type high-pressure homogenizer in which a dispersion liquid is subjected to liquid-liquid collision or liquid-wall collision in a high-pressure state to achieve dispersion and a penetration-type high pressure homogenizer in which dispersion is performed by causing a dispersion liquid to pass through a fine flow path in a high-pressure state.

Note that, during this dispersion, it is effective that the average particle size of the charge generation material in the charge generation layer-forming coating liquid is set to 0.5 μm or less, preferably 0.3 μm or less, still more preferably 0.15 μm or less.

Examples of the method of applying the charge generation layer-forming coating liquid onto the undercoat layer (or onto the intermediate layer) include ordinary methods such as a blade coating method, a wire bar coating method, a spray coating method, a dip coating method, a bead coating method, an air knife coating method, and a curtain coating method.

The charge generation layer is formed so as to have a thickness of, for example, preferably 0.1 μm or more and 5.0 μm or less, more preferably 0.2 μm or more and 2.0 μm or less.

Charge Transport Layer

As described above, the charge transport layer is the uppermost surface layer and contains a charge transport material, a polyester resin serving as a binder resin and including the polyester resin (1) including a specific diol unit, and the compound (T).

The charge transport layer may be a layer containing a polymer charge transport material.

Examples of the charge transport material include electron transport compounds such as quinone-based compounds such as p-benzoquinone, chloranil, bromanil, and anthraquinone; tetracyanoquinodimethane-based compounds; fluorenone compounds such as 2,4,7-trinitrofluorenone; xanthone-based compounds; benzophenone-based compounds; cyano vinyl-based compounds; and ethylene-based compounds. Other examples of the charge transport material include hole transport compounds such as triarylamine-based compounds, benzidine-based compounds, arylalkane-based compounds, aryl-substituted ethylene-based compounds, stilbene-based compounds, anthracene-based compounds, and hydrazone-based compounds. These charge transport materials are used alone or in combination of two or more thereof, which are non-limiting examples.

Examples of the polymer charge transport material include publicly known chemical substances having charge transport properties such as poly-N-vinylcarbazole and polysilane. For example, preferred are polyester-based polymer charge transport materials. Such polymer charge transport materials may be used alone or in combination with a binder resin.

Examples of the charge transport material or polymer charge transport material include polycyclic aromatic compounds, aromatic nitro compounds, aromatic amine compounds, heterocyclic compounds, hydrazone compounds, styryl compounds, enamine compounds, benzidine compounds, triarylamine compounds (in particular, triphenylamine compounds), diamine compounds, oxadiazole compounds, carbazole compounds, organic polysilane compounds, pyrazoline compounds, indole compounds, oxazole compounds, isooxazole compounds, thiazole compounds, thiadiazole compounds, imidazole compounds, pyrazole compounds, triazole compounds, cyano compounds, benzofuran compounds, aniline compounds, butadiene compounds, and resins including groups derived from the foregoing substances. Specific examples include compounds described in Paragraphs 0078 to 0080 of Japanese Unexamined Patent Application Publication No. 2021-117377, Paragraphs 0046 to 0048 of Japanese Unexamined Patent Application Publication No. 2019-035900, Paragraphs 0052 to 0053 of Japanese Unexamined Patent Application Publication No. 2019-012141, Paragraphs 0122 to 0134 of Japanese Unexamined Patent Application Publication No. 2021-071565, Paragraphs 0101 to 0110 of Japanese Unexamined Patent Application Publication No. 2021-015223, Paragraph 0116 of Japanese Unexamined Patent Application Publication No. 2013-097300, Paragraphs 0309 to 0316 of International Publication No. 2019/070003, Paragraphs 0103 to 0107 of Japanese Unexamined Patent Application Publication No. 2018-159087, and Paragraphs 0102 to 0113 of Japanese Unexamined Patent Application Publication No. 2021-148818.

The charge transport material preferably contains, from the viewpoint of charge mobility, at least one selected from the group consisting of a chemical substance (C1) represented by Formula (C1) below, a chemical substance (C2) represented by Formula (C2) below, a chemical substance (C3) represented by Formula (C3) below, and a chemical substance (C4) represented by Formula (C4) below.

Formula (C1)

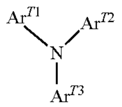

In Formula (C1), $Ar^{T1}$, $Ar^{T2}$, and $Ar^{T3}$ are each independently an aryl group, $—C_6H_4—C(R^{T4})═C(R^{T5})(R^{T6})$ or $—C_6H_4—CH═CH—CH═C(R^{T7})(R^{T8})$. $R^{T4}$. $R^{T5}$. $R^{T6}$, $R^{T7}$, and $R^{T8}$ are each independently a hydrogen atom, an alkyl group, or an aryl group. When $R^{T5}$ and $R^{T6}$ are aryl groups, the aryl groups may be linked together through divalent groups $—C(R^{51})(R^{52})—$ and/or $—C(R^{61})═C(R^{62})—$. $R^{51}$. $R^{52}$, $R^{61}$, and $R^{62}$ are each independently a hydrogen atom or an alkyl group having 1 or more and 3 or less carbon atoms.

Groups in Formula (C1) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

The chemical substance (C1) is, from the viewpoint of charge mobility, preferably a chemical substance including at least one of an aryl group or $—C_6H_4—CH═CH—CH═C(R^{T7})(R^{T8})$, more preferably a chemical substance (C'1) represented by the following Formula (C'1).

Formula (C'1)

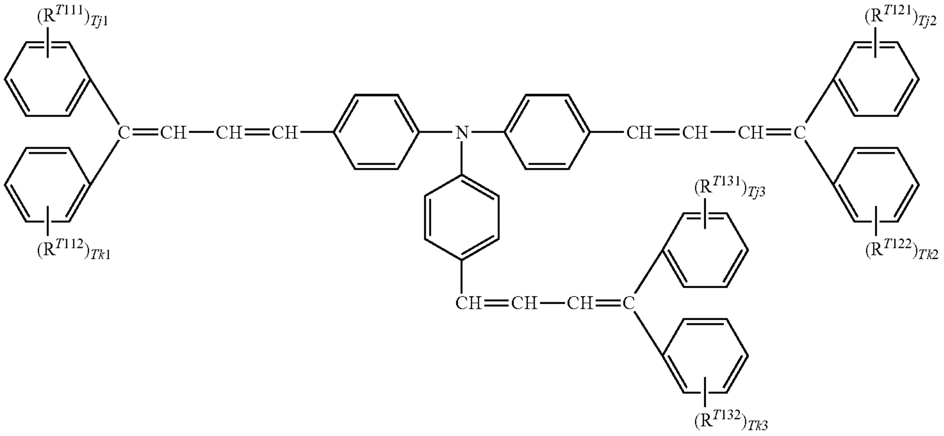

In Formula (C'1), $R^{T111}$, $R^{T112}$, $R^{T121}$, $R^{T122}$, $R^{T131}$, and $R^{T132}$ are each independently a hydrogen atom, a halogen atom, an alkyl group (preferably an alkyl group having 1 or more and 3 or less carbon atoms), an alkoxy group (preferably an alkoxy group having 1 or more and 3 or less carbon atoms), a phenyl group, or a phenoxy group. Tj1, Tj2, Tj3, Tk1, Tk2, and Tk3 are each independently 0, 1, or 2.

Formula (C2)

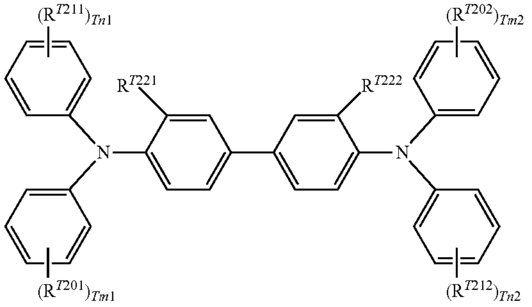

In Formula (C2), $R^{T201}$, $R^{T202}$, $R^{T211}$, and $R^{T212}$ are each independently a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, —$C(R^{T21})$═$C(R^{T22})(R^{T23})$, or —CH═CH—CH═$C(R^{T24})(R^{T25})$. $R^{T21}$, $R^{T22}$, $R^{T23}$, $R^{T24}$, and $R^{T25}$ are each independently a hydrogen atom, an alkyl group, or an aryl group. $R^{T221}$ and $R^{T222}$ are each independently a hydrogen atom, a halogen atom, an alkyl group having 1 or more and 5 or less carbon atoms, or an alkoxy group having 1 or more and 5 or less carbon atoms. Tm1, Tm2, Tn1, and Tn2 are each independently 0, 1, or 2.

Groups in Formula (C2) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

The chemical substance (C2) is, from the viewpoint of charge mobility, preferably a chemical substance including at least one of an alkyl group, an aryl group, or —CH═CH—CH═$C(R^{T24})(R^{T25})$, more preferably a chemical substance including two of an alkyl group, an aryl group, or —CH═CH—CH═$C(R^{T24})(R^{T25})$.

Formula (C3)

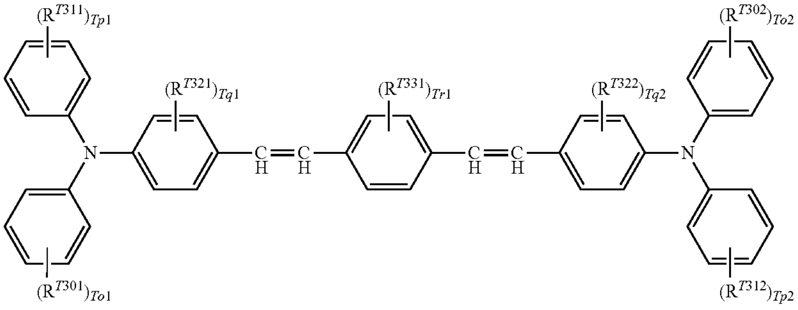

In Formula (C3), $R^{T301}$, $R^{T302}$, $R^{T311}$, and $R^{T312}$ are each independently a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, —$C(R^{T31})$═$C(R^{T32})(R^{T33})$, or —CH═CH—

CH═C($R^{T34}$)($R^{T35}$). $R^{T31}$, $R^{T32}$, $R^{T33}$, $R^{T34}$, and $R^{T35}$ are each independently a hydrogen atom, an alkyl group, or an aryl group. $R^{T321}$, $R^{T322}$, and $R^{T331}$ are each independently a hydrogen atom, a halogen atom, an alkyl group having 1 or more and 5 or less carbon atoms, or an alkoxy group having 1 or more and 5 or less carbon atoms. To1, To2, Tp1, Tp2, Tq1, Tq2, and Tr1 are each independently 0, 1, or 2.

Groups in Formula (C3) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

Formula (C4)

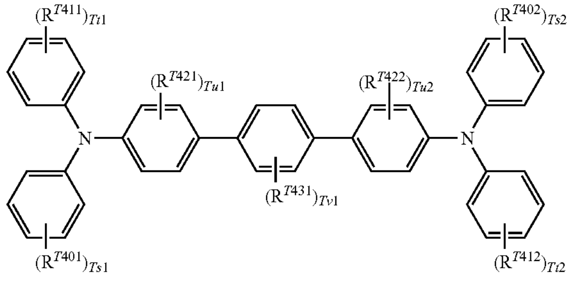

In Formula (C4), $R^{T401}$, $R^{T402}$, $R^{T411}$, and $R^{T412}$ are each independently a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, —C($R^{T41}$)═C($R^{T42}$)($R^{T43}$), or —CH═CH—CH═C($R^{T44}$)($R^{T45}$). $R^{T41}$, $R^{T42}$, $R^{T43}$, $R^{T44}$, and $R^{T45}$ are each independently a hydrogen atom, an alkyl group, or an aryl group. $R^{T421}$, $R^{T422}$, and $R^{T431}$ are each independently a hydrogen atom, a halogen atom, an alkyl group having 1 or more and 5 or less carbon atoms, or an alkoxy group having 1 or more and 5 or less carbon atoms. Ts1, Ts2, Tt1, Tt2, Tu1, Tu2, and Tv1 are each independently 0, 1, or 2.

Groups in Formula (C4) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

In the charge transport layer, the charge transport material content relative to the total mass of the charge transport layer may be 20 mass % or more and 70 mass % or less.

The charge transport layer may contain, as the binder resin, a polyester resin at least including the polyester resin (1). Relative to the total amount of binder resin contained in the charge transport layer, the polyester resin content is preferably 60 mass % or more, more preferably 70 mass % or more, still more preferably 80 mass % or more, particularly preferably 90 mass % or more. In the case of using the polyester resin in combination with another resin, the other resin may be a polycarbonate resin The charge transport layer may contain another binder resin other than polyester resins. Examples of the other binder resin include polycarbonate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, styrene-alkyd resins, poly-N-vinylcarbazole, and polysilane. These binder resins are used alone or in combination of two or more thereof.

The charge transport layer may further contain a publicly known additive. Examples of the additive include an antioxidant, a leveling agent, a defoaming agent, a filler, and a viscosity modifier.

Formation of the charge transport layer is not particularly limited and may be performed by a well-known formation method. For example, a charge transport layer-forming coating liquid prepared by adding the above-described components to a solvent is used to form a coating film and the coating film is dried and optionally heated.

Examples of the solvent used for preparing the charge transport layer-forming coating liquid include ordinary organic solvents including aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. Such solvents are used alone or as a mixture of two or more thereof.

Examples of the coating method of applying the charge transport layer-forming coating liquid onto the charge generation layer include ordinary methods such as a blade coating method, a wire bar coating method, a spray coating method, a dip coating method, a bead coating method, an air knife coating method, and a curtain coating method.

The charge transport layer is formed so as to have a thickness of, for example, preferably 5 μm or more and 50 μm or less, more preferably 10 μm or more and 30 μm or less.

Image Forming Apparatus (and Process Cartridge)

An image forming apparatus according to this exemplary embodiment includes an electrophotographic photoreceptor, a charging device that charges the surface of the electrophotographic photoreceptor, an electrostatic latent image forming device that forms, on the charged surface of the electrophotographic photoreceptor, an electrostatic latent image, a developing device that uses a developer containing toner to develop the electrostatic latent image on the surface of the electrophotographic photoreceptor to form a toner image, and a transfer device that transfers the toner image onto the surface of a recording medium. As the electrophotographic photoreceptor, the above-described electrophotographic photoreceptor according to this exemplary embodiment is used.

The image forming apparatus according to this exemplary embodiment may further include a cleaning device including a cleaning blade that is in contact with the surface of the electrophotographic photoreceptor and cleans the surface of the electrophotographic photoreceptor.

The image forming apparatus according to this exemplary embodiment is applicable to well-known image forming apparatuses including an apparatus including a fixing device that fixes a toner image having been transferred to the surface of a recording medium; a direct-transfer-type apparatus that transfers a toner image having been formed on the surface of the electrophotographic photoreceptor, directly to a recording medium; an intermediate-transfer-type apparatus that subjects a toner image having been formed on the surface of the electrophotographic photoreceptor, to first transfer to the surface of an intermediate transfer body, and subjects the toner image having been transferred to the surface of the intermediate transfer body, to second transfer to the surface of a recording medium; an apparatus including a cleaning device that, after transfer of a toner image and before charging, cleans the surface of the electrophotographic photoreceptor; an apparatus including a discharging device that, after transfer of a toner image and before charging, irradiates the surface of the electrophotographic photoreceptor with discharging light to discharge the surface; and an apparatus including an electrophotographic photoreceptor heating member that increases the temperature of the electrophotographic photoreceptor to decrease the relative temperature.

In the case of the intermediate-transfer-type apparatus, the transfer device has a structure including, for example, an intermediate transfer body to the surface of which a toner image is transferred, a first transfer device that subjects the toner image having been formed on the surface of the electrophotographic photoreceptor, to first transfer to the surface of the intermediate transfer body, and a second transfer device that subjects the toner image having been transferred to the surface of the intermediate transfer body, to second transfer to the surface of a recording medium.

The image forming apparatus according to this exemplary embodiment may be a dry-development-type image forming apparatus or a wet-development-type (development type using a liquid developer) image forming apparatus.

Note that, in the image forming apparatus according to this exemplary embodiment, for example, a part including the electrophotographic photoreceptor may have a cartridge structure (process cartridge) that is attachable to and detachable from the image forming apparatus. The process cartridge may be, for example, a process cartridge including the electrophotographic photoreceptor according to this exemplary embodiment. Note that the process cartridge may include, in addition to the electrophotographic photoreceptor, for example, at least one selected from the group consisting of a charging device, an electrostatic latent image forming device, a developing device, and a transfer device.

The process cartridge may further include a cleaning device including a cleaning blade that is in contact with the surface of the electrophotographic photoreceptor and cleans the surface of the electrophotographic photoreceptor.

Hereinafter, non-limiting examples of the image forming apparatus according to this exemplary embodiment will be described. Note that some portions in the drawings will be described, but descriptions of the other portions will be omitted.

Figure 2:
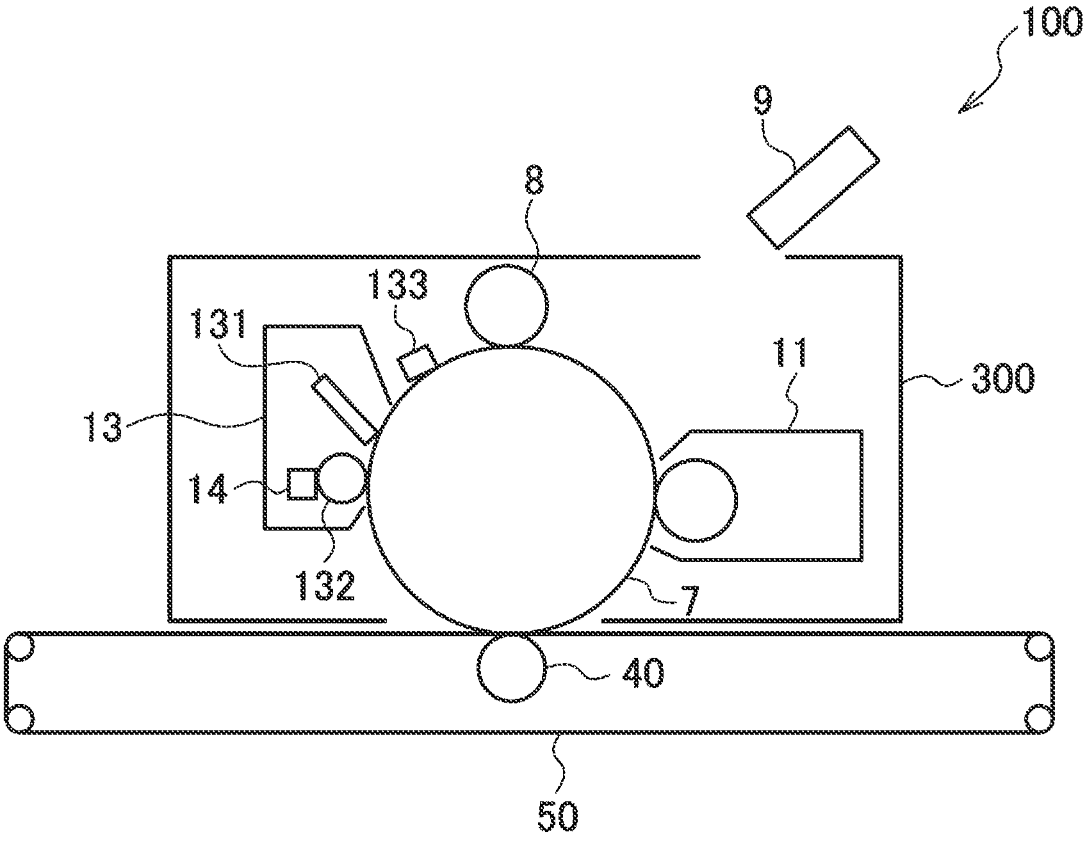
FIG. 2 is a schematic configuration view illustrating an example of an image forming apparatus according to an exemplary embodiment.

FIG. 2 is a schematic configuration view illustrating an example of the image forming apparatus according to this exemplary embodiment.

Referring to FIG. 2, an image forming apparatus 100 according to this exemplary embodiment includes a process cartridge 300 including an electrophotographic photoreceptor 7, an exposure device 9 (serving as an example of the electrostatic latent image forming device), a transfer device 40 (first transfer device), and an intermediate transfer body 50. Note that, in the image forming apparatus 100, the exposure device 9 is disposed at a position where it can expose the electrophotographic photoreceptor 7 through the opening of the process cartridge 300, the transfer device 40 is disposed at a position where it faces the electrophotographic photoreceptor 7 with the intermediate transfer body 50 disposed therebetween, and the intermediate transfer body 50 is disposed such that a portion thereof is in contact with the electrophotographic photoreceptor 7. The image forming apparatus 100 also includes a second transfer device (not shown) that transfers the toner image having been transferred to the intermediate transfer body 50, to a recording medium (such as a paper sheet). Note that the intermediate transfer body 50, the transfer device 40 (first transfer device), and the second transfer device (not shown) are examples of the transfer device.

Referring to FIG. 2, the process cartridge 300 collectively supports, within the housing, the electrophotographic photoreceptor 7, a charging device 8 (serving as an example of the charging device), a developing device 11 (serving as an example of the developing device), and a cleaning device 13 (serving as an example of the cleaning device). The cleaning device 13 includes a cleaning blade (serving as an example of the cleaning member) 131 and the cleaning blade 131 is disposed so as to be in contact with the surface of the electrophotographic photoreceptor 7. Note that the cleaning member may be, instead of the cleaning blade 131, a conductive or insulating fibrous member, which may be used alone or in combination with the cleaning blade 131.

Note that FIG. 2 illustrates an exemplary configuration of the image forming apparatus including a fibrous member 132 (roll form) that supplies a lubricant 14 to the surface of the electrophotographic photoreceptor 7, and a fibrous member 133 (flat brush form) that aids cleaning, which are optionally disposed.

Hereinafter, elements of the image forming apparatus according to this exemplary embodiment will be described.

Charging Device

Examples of the charging device 8 include contact-type chargers using a conductive or semiconductive charging roller, charging brush, charging film, charging rubber blade, or charging tube, for example. Other examples include publicly known chargers such as non-contact-type roller chargers and scorotron chargers and corotron chargers, which use corona discharge.

Exposure Device

Examples of the exposure device 9 include optical devices that expose, in accordance with a predetermined image, the surface of the electrophotographic photoreceptor 7 to light such as semiconductor laser light, LED light, or liquid crystal shutter light. The wavelength of the light source is set within the spectral sensitivity range of the electrophotographic photoreceptor. For the wavelengths of semiconductor lasers, near-infrared lasers having a lasing wavelength at about 780 nm are often used. However, this wavelength is a non-limiting example and lasers having lasing wavelengths of 600 nm or more and less than 700 nm or lasers referred to as blue lasers and having lasing wavelengths of 400 nm or more and 450 nm or less may also be used. In order to form color images, surface-emission-type laser light sources that output multiple beams may also be used.

Developing Device

Examples of the developing device 11 include ordinary developing devices that perform development using developers in contact or non-contact manners. The developing device 11 is not particularly limited as long as it has the above-described function and is selected in accordance with the purpose. Examples include publicly known development devices that use, for example, a brush or a roller to cause a one-component developer or a two-component developer to adhere to the electrophotographic photoreceptor 7. In particular, a development device using a development roller holding a developer in the surface is preferably used.

The developer used for the developing device 11 may be a one-component developer composed of toner alone or may be a two-component developer containing toner and carriers. The developer may be magnetic or non-magnetic. For the developer, well-known developers are applicable.

Cleaning Device

As the cleaning device 13, a cleaning-blade-type device including the cleaning blade 131 is used.

Note that the cleaning-blade-type cleaning device 13 may be used in combination with a fur-brush-cleaning-type or development-cleaning-simultaneous-type cleaning device, for example.

Transfer Device

Examples of the transfer device 40 include publicly known transfer chargers including contact-type transfer chargers using, for example, a belt, a roller, a film, or a rubber blade and scorotron transfer chargers and corotron transfer chargers, which use corona discharge.

Intermediate Transfer Body

As the intermediate transfer body 50, a belt-shaped body containing semiconductive polyimide, polyamide-imide, polycarbonate, polyarylate, polyester, or rubber, for example, (intermediate transfer belt) is used. For the shape of the intermediate transfer body, instead of the belt shape, a drum shape may be used.

Figure 3:
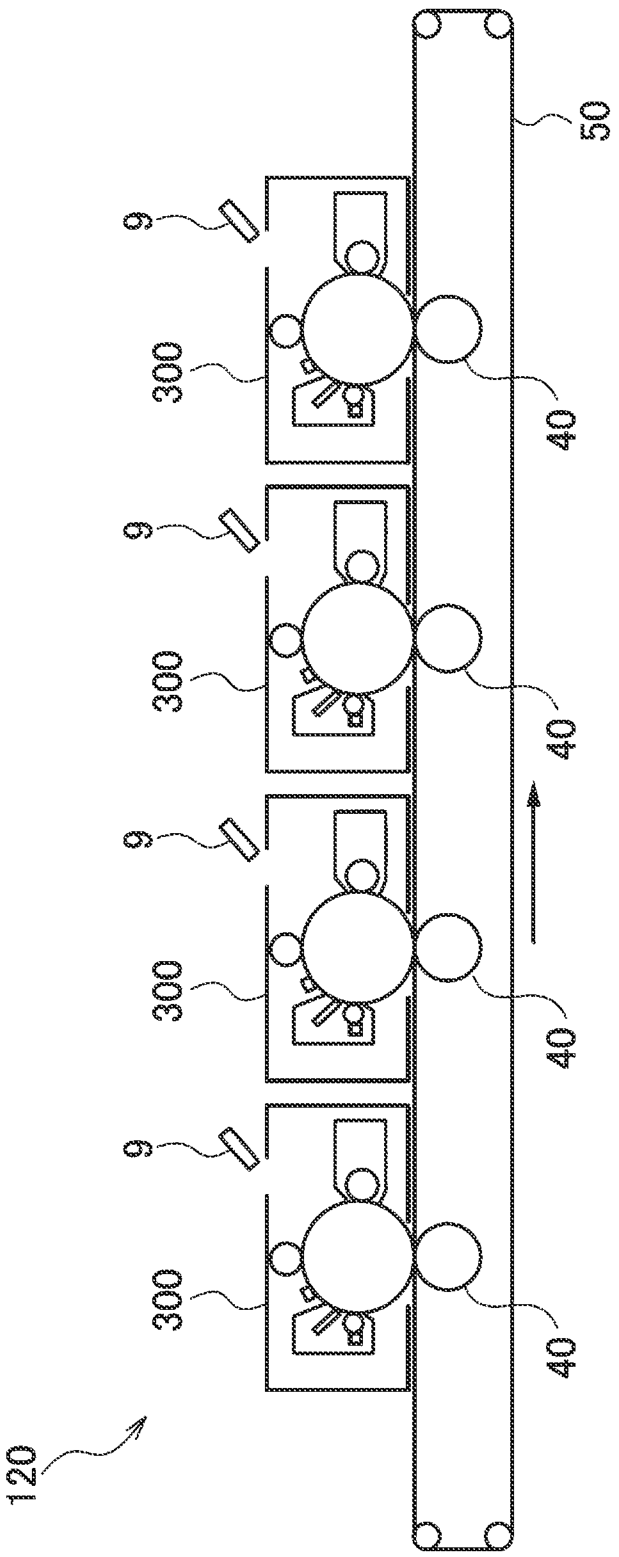
FIG. 3 is a schematic configuration view illustrating another example of the image forming apparatus according to the exemplary embodiment.

FIG. 3 is a schematic configuration view illustrating another example of the image forming apparatus according to this exemplary embodiment.

Referring to FIG. 3, an image forming apparatus 120 is a tandem-system multicolor image forming apparatus including four process cartridges 300. In the image forming apparatus 120, on an intermediate transfer body 50, the four process cartridges 300 are arranged in parallel and one of the electrophotographic photoreceptors is used for one of the colors. Note that the image forming apparatus 120 has the same configuration as the image forming apparatus 100 except for the tandem system.

EXAMPLES

Hereinafter, exemplary embodiments according to the present disclosure will be described in detail with reference to Examples; however, exemplary embodiments according to the present disclosure are not limited to these Examples at all.

In the following descriptions, "part" and "%" are based on mass unless otherwise specified.

In the following descriptions, synthesis, treatment, production, and the like are performed at room temperature (25° C.±3° C. unless otherwise specified.

Preparation of Resin of Photosensitive Layer

Polyester Resin

As the polyester resin (1), polyester resins (PE1) to (PE6) are prepared. Table 1 will describe the constitutional units and composition of the polyester resins, weight-average molecular weights (Mw), the mass ratios of the units including a biphenyl skeleton relative to the polyester resins ("Biphenyl ratio (mass %)" in the Table), and the total mass ratios of the specific diol units relative to the polyester resins ("Diol ratio (mass %)" in the Table).

Note that, in the preparation of polyester resins (PE1) to (PE6), as an end capping agent, 2,3,5-trimethylphenol is used.

Table 1 describes "Constitutional unit: Composition ratio" (for example, A2-3: 50). Such composition ratios are the ratios of the dicarboxylic acid units and the diol units in mol %.

In Table 1, A2-3 and the like are the above-described specific examples of the dicarboxylic acid unit (A).

In Table 1, P1-2 and the like are the above-described specific examples of the diol unit (B).

TABLE 1

| Resin No. | Dicarboxylic acid unit | | Diol unit | | Mw ($\times 10^4$) | Biphenyl ratio (mass %) | Diol ratio (mass %) |
|---|---|---|---|---|---|---|---|
| PE1 | A2-3: 50 | | P1-2: 50 | | 11 | 51 | 49 |
| PE2 | A2-3: 50 | | P2-9: 50 | | 12 | 56 | 44 |
| PE3 | A2-3: 50 | | P1-6: 50 | | 10 | 47 | 53 |
| PE4 | A2-3: 50 | | P2-9: 25 | P6-4: 25 | 11 | 50 | 50 |
| PE5 | A2-3: 25 | A3-2: 25 | P3-4: 25 | B7-1: 25 | 12 | 51 | 49 |
| PE6 | A2-3: 25 | A4-3: 25 | P5-1: 50 | | 13 | 65 | 35 |

As a comparative polyester resin, a polyester resin (PEc1), which is not the polyester resin (1), is prepared. The constitutional units of the polyester resin (PEc1) will be described below. The composition ratio is dicarboxylic acid unit:diol unit=50 mol:50 mol. The polyester resin (PEc1) has a weight-average molecular weight of 100,000.

Polyester resin (PEc1)

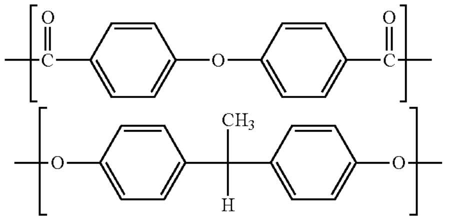

As a comparative polyester resin, a polyester resin (PEc2), which is not the polyester resin (1), is prepared. Specifically, the constitutional units of the polyester resin (PEc2) are the dicarboxylic acid unit A2-3 and the diol units P2-9 and P6-4. The composition ratio is dicarboxylic acid unit:diol units=50 mol:50 mol. The composition ratio of the diol units P2-9 and P6-4 is P2-9:P6-4=25 mol:25 mol. Except for use of, as an end capping agent, T1 below, the same procedures as in the polyester resin (PE4) are performed to obtain the polyester resin (PEc2). The polyester resin (PEc2) has a weight-average molecular weight of 120,000.

$HO-CH_2-CF_2-CF_2-CF_2-CF_2-CF_2-CF_3$ (End capping agent T1)

Production of Photoreceptor Including Multilayered Photosensitive Layer

Example S1

Formation of Undercoat Layer

As a conductive base body, an aluminum cylindrical tube having an outer diameter of 30 mm, a length of 250 mm, and a wall thickness of 1 mm is prepared.

Zinc oxide (average particle size: 70 nm, specific surface area: 15 $m^2/g$, manufactured by TAYCA CORPORATION, 100 parts) is stirred and mixed with 500 parts of toluene; 1.3 parts of a silane coupling agent (trade name: KBM603, manufactured by Shin-Etsu Chemical Co., Ltd., N-2-(aminoethyl)-3-aminopropyltrimethoxysilane) is added and stirred for 2 hours. Subsequently, the toluene is distilled off under a reduced pressure and baking at 120° C. is performed for 3 hours, to obtain zinc oxide surface-treated with the silane coupling agent.

The surface-treated zinc oxide (110 parts) is stirred and mixed with 500 parts of tetrahydrofuran; to this, a solution prepared by dissolving 0.6 parts of alizarin in 50 parts of tetrahydrofuran is added and stirring is performed at 50° ° C. for 5 hours. Subsequently, filtration under a reduced pressure is performed to obtain the solid content and the solid content is dried under a reduced pressure at 60° C., to obtain alizarin-adhered zinc oxide.

A solution (100 parts) prepared by dissolving 60 parts of the alizarin-adhered zinc oxide, 13.5 parts of a curing agent (blocked isocyanate, trade name: SUMIDUR 3175, manufactured by Sumika Bayer Urethane Co., Ltd.), and 15 parts of a butyral resin (trade name: S-LEC BM-1, manufactured by SEKISUI CHEMICAL CO., LTD.) in 68 parts of methyl ethyl ketone is mixed with 5 parts of methyl ethyl ketone and dispersion is performed using glass beads having a diameter of 1 mm in a sand mill for 2 hours, to obtain a dispersion liquid. To the dispersion liquid, 0.005 parts of dioctyl tin dilaurate serving as a catalyst and 4 parts of silicone resin particles (trade name: TOSPEARL 145, manufactured by Momentive Performance Materials Inc.) are added, to obtain an undercoat layer-forming coating liquid. The undercoat layer-forming coating liquid is applied, by the dip coating method, to the outer circumferential surface of the conductive base body and dry-cured at 170° C. for 40 minutes, to form an undercoat layer. The undercoat layer has an average thickness of 25 μm.

Formation of Charge Generation Layer

A mixture of 15 parts of hydroxygallium phthalocyanine (having diffraction peaks at least at Bragg angles (2θ±0.2°) of 7.5°, 9.9°, 12.5°, 16.3°, 18.6°, 25.1°, and 28.3° in an X-ray diffraction spectrum determined using Cuka characteristic X-ray) serving as a charge generation substance, 10 parts of a vinyl chloride-vinyl acetate copolymer resin (trade name: VMCH, manufactured by Nippon Unicar Company Limited) serving as a binder resin, and 200 parts of n-butyl acetate is dispersed using glass beads having a diameter of 1 mm in a sand mill for 4 hours. To the dispersion liquid, 175 parts of n-butyl acetate and 180 parts of methyl ethyl ketone are added and stirred to obtain a charge generation layer-forming coating liquid. The charge generation layer-forming coating liquid is applied onto the undercoat layer by dip coating and dried at room temperature (25° C.±3° C. to form a charge generation layer having an average thickness of 0.18 μm.

Formation of Charge Transport Layer

The polyester resin (PE1) (60 parts), 40 parts of a charge transport material CTM-1, and 6 parts of the compound (T1-3) are dissolved in 270 parts of tetrahydrofuran and 30 parts of toluene, to obtain a charge transport layer-forming coating liquid. The charge transport layer-forming coating liquid is applied onto the charge generation layer by dip coating and dried at 145° C. for 30 minutes, to form a charge transport layer. The charge transport layer has an average thickness of 30 μm.

CTM-1

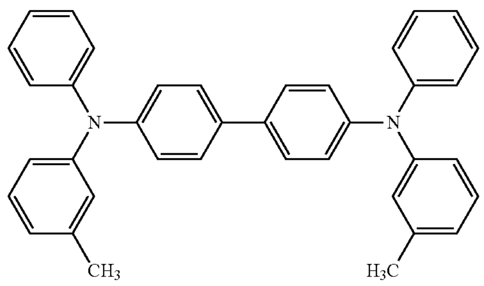

Examples S2 to S77 and Comparative Examples SC1 to SC4

The same procedures as in Example S1 are performed except that the type of the resin of the charge transport layer, the type of the compound (T), and the compound (T) content (parts by mass) relative to 100 parts by mass of the resin are changed as described in Table 2 to Table 4, to prepare photoreceptors.

Note that T1-3 and the like in the Tables are the above-described specific examples of the compound (T).

Evaluation of Performance of Photoreceptors

Wear Resistance

The photoreceptor of each of Examples and Comparative Examples is mounted on an electrophotographic image forming apparatus (manufactured by FUJIFILM Business Innovation Corp., Apeos C4570); in an environment at a temperature of 30° C. and a relative humidity of 85%, 1% solid images, images having an area coverage of 1% are formed on 100,000 A3-sized paper sheets. Subsequently, in an environment at a temperature of 10° ° C. and a relative humidity of 15%, 100% solid images, solid images having an area coverage of 100% are formed on 100,000 A3-sized paper sheets. Such image formation (specifically, the formation of 100,000 images in the environment at a temperature of 30° C. and a relative humidity of 85% and the formation of 100,000 images in the environment at a temperature of 10° C. and a relative humidity of 15%; thus, the formation of 200,000 images in total) is repeated five times. Before and after the image formation (specifically, the formation of 1,000,000 images in total), the average thickness of the charge transport layer is determined and the difference in the average thickness before and after the image formation is determined as wear loss (nm). As a thickness measurement system for the layer, a PERMASCOPE from Fischer Instruments K.K. is used.

Such wear losses are graded into one of the following grades. Table 2 to Table 4 will describe the results.

A: wear loss of less than 500 nm

B: wear loss of 500 nm or more and less than 1000 nm

C: wear loss of 1000 nm or more and less than 1500 nm

D: wear loss of 1500 nm or more and less than 2000 nm

E: wear loss of 2000 nm or more

Cracking Resistance

The photoreceptor of each of Examples and Comparative Examples is attached to an image forming apparatus Apeos C4570 manufactured by FUJIFILM Business Innovation Corp. To the black toner cartridge, cylindrical carbon fibers (average diameter: 10 μm, average length: 70 μm) are added.

In a high-temperature, high-humidity environment at a temperature of 30° C. and a relative humidity of 85%, black images having an image density of 10% are continuously output over the entirety of one sides of 1000 A4-sized paper sheets. The last 10 images are visually observed and the number of black dots is counted. The photoreceptor is subjected to surface analysis; a laser microscope manufactured by Lasertec Corporation is used at a magnification of 20×; within 10 fields of view, from the irregularity profiles of regions where piercing of foreign substances occurs, crack depths (μm) are measured and averaged. Table 2 to Table 4 will describe the results.

TABLE 2

| | Charge transport layer | | | Evaluation | | |
|---|---|---|---|---|---|---|
| | Polyester resin | Compound (T) | | Wear | Black dots | Crack depth |
| | Type | Type | Content | resistance | (Number) | (μm) |
| Comparative Example SC1 | PEc1 | T1-3 | 10 | E | 10549 | 6.0 |
| Example S1 | PE1 | T1-3 | 10 | A | 1558 | 0.6 |
| Example S2 | PE1 | T1-3 | 1 | B | 2827 | 1.2 |
| Example S3 | PE1 | T1-3 | 4 | B | 1519 | 0.9 |
| Example S4 | PE1 | T1-3 | 6 | B | 1461 | 0.7 |
| Example S5 | PE1 | T1-3 | 8 | A | 1492 | 0.8 |
| Example S6 | PE1 | T1-3 | 12 | A | 1527 | 1.2 |
| Example S7 | PE1 | T1-3 | 14 | B | 1582 | 2.0 |
| Example S8 | PE1 | T1-3 | 16 | C | 1518 | 2.4 |
| Example S9 | PE1 | T1-3 | 19 | C | 2909 | 2.8 |
| Comparative Example SC2 | PEc1 | T1-2 | 10 | E | 10749 | 8.0 |
| Example S10 | PE1 | T1-2 | 10 | A | 1659 | 1.0 |
| Example S11 | PE1 | T1-2 | 1 | C | 3111 | 3.2 |
| Example S12 | PE1 | T1-2 | 4 | B | 1667 | 2.8 |
| Example S13 | PE1 | T1-2 | 6 | B | 1681 | 2.0 |
| Example S14 | PE1 | T1-2 | 8 | B | 1721 | 1.6 |
| Example S15 | PE1 | T1-2 | 12 | A | 1666 | 1.2 |
| Example S16 | PE1 | T1-2 | 14 | B | 1751 | 1.8 |
| Example S17 | PE1 | T1-2 | 16 | C | 1703 | 2.0 |
| Example S18 | PE1 | T1-2 | 19 | C | 3148 | 2.6 |
| Example S19 | PE2 | T1-3 | 10 | A | 2135 | 0.7 |
| Example S20 | PE2 | T1-3 | 1 | C | 3956 | 1.9 |
| Example S21 | PE2 | T1-3 | 4 | B | 2061 | 0.9 |
| Example S22 | PE2 | T1-3 | 6 | B | 2077 | 0.8 |
| Example S23 | PE2 | T1-3 | 8 | B | 2144 | 0.8 |
| Example S24 | PE2 | T1-3 | 12 | A | 2200 | 0.7 |
| Example S25 | PE2 | T1-3 | 14 | B | 2109 | 0.6 |
| Example S26 | PE2 | T1-3 | 16 | C | 2171 | 0.6 |
| Example S27 | PE2 | T1-3 | 19 | C | 4131 | 1.4 |
| Example S28 | PE2 | T1-2 | 10 | A | 2314 | 0.8 |
| Example S29 | PE2 | T1-2 | 1 | C | 4341 | 2.0 |
| Example S30 | PE2 | T1-2 | 4 | B | 2271 | 0.9 |
| Example S31 | PE2 | T1-2 | 6 | B | 2243 | 0.9 |
| Example S32 | PE2 | T1-2 | 8 | B | 2257 | 0.8 |
| Example S33 | PE2 | T1-2 | 12 | A | 2250 | 0.7 |
| Example S34 | PE2 | T1-2 | 14 | B | 2296 | 0.7 |
| Example S35 | PE2 | T1-2 | 16 | C | 2261 | 0.6 |
| Example S36 | PE2 | T1-2 | 19 | C | 4337 | 1.6 |

TABLE 3

| | Charge transport layer | | | Evaluation | | |
|---|---|---|---|---|---|---|
| | Polyester resin | Compound (T) | | Wear | Black dots | Crack depth |
| | Type | Type | Content | resistance | (Number) | (μm) |
| Example S37 | PE3 | T1-3 | 10 | A | 2928 | 1.1 |
| Example S38 | PE3 | T1-3 | 1 | C | 5627 | 2.7 |
| Example S39 | PE3 | T1-3 | 4 | B | 2890 | 1.3 |
| Example S40 | PE3 | T1-3 | 6 | B | 2875 | 1.2 |
| Example S41 | PE3 | T1-3 | 8 | B | 2894 | 1.2 |
| Example S42 | PE3 | T1-3 | 12 | A | 2959 | 1.1 |
| Example S43 | PE3 | T1-3 | 14 | B | 3020 | 1.0 |
| Example S44 | PE3 | T1-3 | 16 | C | 3021 | 1.0 |
| Example S45 | PE3 | T1-3 | 19 | C | 5732 | 2.2 |
| Example S46 | PE3 | T1-2 | 10 | A | 3136 | 1.2 |
| Example S47 | PE3 | T1-2 | 1 | C | 5899 | 2.8 |
| Example S48 | PE3 | T1-2 | 4 | B | 3044 | 1.3 |
| Example S49 | PE3 | T1-2 | 6 | B | 3054 | 1.3 |
| Example S50 | PE3 | T1-2 | 8 | B | 3107 | 1.2 |
| Example S51 | PE3 | T1-2 | 12 | A | 3104 | 1.1 |
| Example S52 | PE3 | T1-2 | 14 | B | 3154 | 1.1 |

TABLE 3-continued

| | Charge transport layer | | | Evaluation | | |
|---|---|---|---|---|---|---|
| | Polyester resin | Compound (T) | | Wear | Black dots | Crack depth |
| | Type | Type | Content | resistance | (Number) | (μm) |
| Example S53 | PE3 | T1-2 | 16 | C | 3105 | 1.0 |
| Example S54 | PE3 | T1-2 | 19 | C | 5970 | 2.4 |
| Example S55 | PE4 | T1-3 | 10 | A | 3792 | 1.5 |
| Example S56 | PE4 | T1-3 | 1 | C | 7137 | 3.5 |
| Example S57 | PE4 | T1-3 | 4 | B | 3756 | 1.7 |
| Example S58 | PE4 | T1-3 | 16 | C | 3771 | 1.4 |
| Example S59 | PE4 | T1-3 | 19 | D | 7309 | 3.0 |
| Example S60 | PE4 | T1-2 | 10 | A | 3839 | 1.6 |
| Example S61 | PE4 | T1-2 | 1 | C | 7504 | 3.6 |
| Example S62 | PE4 | T1-2 | 4 | B | 3804 | 1.7 |
| Example S63 | PE4 | T1-2 | 16 | C | 3869 | 1.4 |
| Example S64 | PE4 | T1-2 | 19 | D | 7620 | 3.2 |
| Example S65 | PE5 | T1-3 | 10 | A | 4536 | 1.9 |
| Example S66 | PE5 | T1-3 | 1 | C | 8802 | 4.3 |
| Example S67 | PE5 | T1-3 | 4 | B | 4467 | 2.1 |
| Example S68 | PE5 | T1-3 | 16 | C | 4608 | 1.8 |
| Example S69 | PE5 | T1-3 | 19 | D | 8888 | 3.8 |
| Example S70 | PE5 | T1-2 | 10 | A | 4645 | 2.0 |
| Example S71 | PE5 | T1-2 | 1 | C | 9134 | 4.4 |
| Example S72 | PE5 | T1-2 | 4 | B | 4644 | 2.1 |
| Example S73 | PE5 | T1-2 | 16 | C | 4670 | 1.8 |
| Example S74 | PE5 | T1-2 | 19 | D | 9210 | 4.0 |

TABLE 4

| | Charge transport layer | | | Evaluation | | |
|---|---|---|---|---|---|---|
| | Polyester resin | Compound (T) | | Wear | Black dots | Crack depth |
| | Type | Type | Content | resistance | (Number) | (μm) |
| Example S75 | PE6 | T1-3 | 9 | B | 2765 | 2.5 |
| Example S76 | PE1 | T2-1 | 12 | B | 2853 | 1.0 |
| Example S77 | PE1 | T3-1 | 8 | B | 2936 | 1.2 |
| Comparative Example SC3 | PE3 | — | 0 | D | 8165 | 10.2 |
| Comparative Example SC4 | PEc2 | T1-3 | 4 | D | 8520 | 5.8 |

Tables 2 to 4 demonstrate that, compared with Comparative Examples, Examples may provide high wear resistance of the photoreceptor surfaces, undergo less occurrence of black dots, and undergo cracks having small depths, and hence may provide both of high wear resistance and high cracking resistance.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An electrophotographic photoreceptor comprising:

a conductive base body; and a multilayered photosensitive layer disposed on the conductive base body and including a charge generation layer and a charge transport layer, wherein the charge transport layer is an uppermost surface layer and contains a charge transport material, a polyester resin, and a compound (T) represented by Formula (T) below, the polyester resin includes a polyester resin (1) including at least one selected from the group consisting of a diol unit (P1) represented by Formula (P1), a diol unit (P2) represented by Formula (P2), a diol unit (P3) represented by Formula (P3), a diol unit (P5) represented by Formula (P5), and a diol unit (P6) represented by Formula (P6), the polyester resin (1) further includes a unit including a biphenyl skeleton, and end groups of the polyester resin (1) do not include fluorine atoms, $$Ar^{T1}\text{-}L^{T1}\text{-}Ar^{T2} \quad \text{Formula (T)}$$

in Formula (T), $Ar^{T1}$ is an optionally substituted naphthyl group or an optionally substituted biphenyl group, $L^{T1}$ is a single bond or an ether bond, and $Ar^{T2}$ is an optionally substituted aryl group having 6 or more and 12 or less carbon atoms or an optionally substituted aralkyl group having 7 or more and 20 or less carbon atoms, Formula (P1)

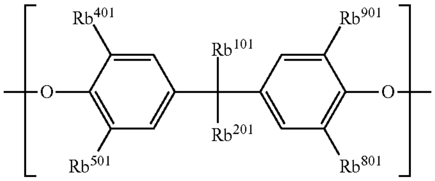

Formula (P2)

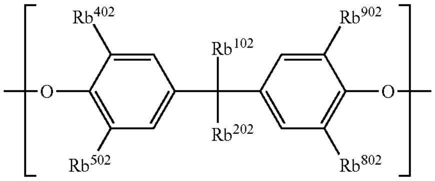

Formula (P3)

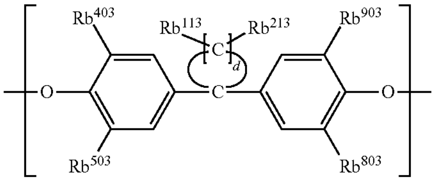

Formula (P5)

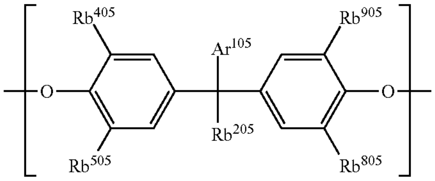

Formula (P6)

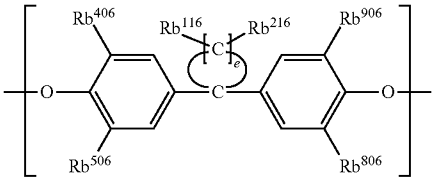

in Formula (P1), $Rb^{101}$ is a branched alkyl group having 4 or more and 20 or less carbon atoms, $Rb^{201}$ is a hydrogen atom or an alkyl group having 1 or more and 3 or less carbon atoms, and $Rb^{401}$, $Rb^{501}$, $Rb^{801}$, and $Rb^{901}$ are each independently a hydrogen atom, an alkyl group having 1 or more and 4 or less carbon atoms, an alkoxy group having 1 or more and 6 or less carbon atoms, or a halogen atom, in Formula (P2), $Rb^{102}$ is a linear alkyl group having 4 or more and 20 or less carbon atoms, $Rb^{202}$ is a hydrogen atom or an alkyl group having 1 or more and 3 or less carbon atoms, and $Rb^{402}$, $Rb^{502}$, $Rb^{802}$, and $Rb^{902}$ are each independently a hydrogen atom, an alkyl group having 1 or more and 4 or less carbon atoms, an alkoxy group having 1 or more and 6 or less carbon atoms, or a halogen atom, in Formula (P3), $Rb^{113}$ and $Rb^{213}$ are each independently a hydrogen atom, a linear alkyl group having 1 or more and 3 or less carbon atoms, an alkoxy group having 1 or more and 4 or less carbon atoms, or a halogen atom, d is an integer of 7 or more and 15 or less, and $Rb^{403}$, $Rb^{503}$, $Rb^{803}$, and $Rb^{903}$ are each independently a hydrogen atom, an alkyl group having 1 or more and 4 or less carbon atoms, an alkoxy group having 1 or more and 6 or less carbon atoms, or a halogen atom, in Formula (P5), $Ar^{105}$ is an aryl group having 6 or more and 12 or less carbon atoms or an aralkyl group having 7 or more and 20 or less carbon atoms, $Rb^{205}$ is a hydrogen atom or an alkyl group having 1 or more and 3 or less carbon atoms, and $Rb^{405}$, $Rb^{505}$, $Rb^{805}$, and $Rb^{905}$ are each independently a hydrogen atom, an alkyl group having 1 or more and 4 or less carbon atoms, an alkoxy group having 1 or more and 6 or less carbon atoms, or a halogen atom, and in Formula (P6), $Rb^{116}$ and $Rb^{216}$ are each independently a hydrogen atom, a linear alkyl group having 1 or more and 3 or less carbon atoms, an alkoxy group having 1 or more and 4 or less carbon atoms, or a halogen atom, e is an integer of 4 or more and 6 or less, and $Rb^{406}$, $Rb^{506}$, $Rb^{806}$, and $Rb^{906}$ are each independently a hydrogen atom, an alkyl group having 1 or more and 4 or less carbon atoms, an alkoxy group having 1 or more and 6 or less carbon atoms, or a halogen atom.

(((2))) The electrophotographic photoreceptor according to (((1))), wherein the unit including the biphenyl skeleton is a dicarboxylic acid unit (A2) represented by Formula (A2), Formula (A2)

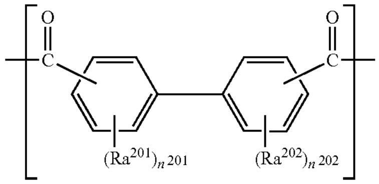

in Formula (A2), $n^{201}$ and $n^{202}$ are each independently an integer of 0 or more and 4 or less, and $n^{201}$ $Ra^{201}$'s and $n^{202}$ $Ra^{202}$'s are each independently an alkyl group having 1 or more and 10 or less carbon atoms, an aryl group having 6 or more and 12 or less carbon atoms, or an alkoxy group having 1 or more and 6 or less carbon atoms.

(((3))) The electrophotographic photoreceptor according to (((1))) or (((2))), wherein, relative to the polyester resin (1), a mass ratio of the unit including the biphenyl skeleton is 20 mass % or more and 70 mass % or less.

(((4))) The electrophotographic photoreceptor according to any one of (((1))) to (((3))), wherein, relative to the polyester resin (1), a total mass ratio of the diol unit (P1), the diol unit (P2), the diol unit (P3), the diol unit (P5), and the diol unit (P6) is 30 mass % or more and 90 mass % or less.

(((5))) The electrophotographic photoreceptor according to any one of (((1))) to (((4))), wherein, relative to 100 parts by mass of the polyester resin, a content of the compound (T) is 1 part by mass or more and 20 parts by mass or less.

(((6))) The electrophotographic photoreceptor according to (((5))), wherein, relative to 100 parts by mass of the polyester resin, the content of the compound (T) is 4 parts by mass or more and 10 parts by mass or less.

(((7))) A process cartridge comprising the electrophotographic photoreceptor according to any one of (((1))) to (((6))), wherein the process cartridge is attachable to and detachable from an image forming apparatus.

(((8))) The process cartridge according to (((7))), further comprising a cleaning device including a cleaning blade that is in contact with a surface of the electrophotographic photoreceptor and cleans the surface of the electrophotographic photoreceptor.

(((9))) An image forming apparatus comprising:

the electrophotographic photoreceptor according to any one of (((1))) to (6)

a charging device that charges a surface of the electrophotographic photoreceptor;

an electrostatic latent image forming device that forms an electrostatic latent image on the charged surface of the electrophotographic photoreceptor;

a developing device that uses a developer containing toner to develop the electrostatic latent image on the surface of the electrophotographic photoreceptor to form a toner image; and a transfer device that transfers the toner image onto a surface of a recording medium.

(((10))) The image forming apparatus according to (((9))), further comprising a cleaning device including a cleaning blade that is in contact with the surface of the electrophotographic photoreceptor and cleans the surface of the electrophotographic photoreceptor.

What is claimed is:

1. An electrophotographic photoreceptor comprising:

a conductive base body; and a multilayered photosensitive layer disposed on the conductive base body and including a charge generation layer and a charge transport layer, wherein the charge transport layer is an uppermost surface layer and contains a charge transport material, a polyester resin, and a compound (T) represented by Formula (T) below, the polyester resin includes a polyester resin (1) including at least one selected from the group consisting of a diol unit (P1) represented by Formula (P1), a diol unit (P2) represented by Formula (P2), a diol unit (P3) represented by Formula (P3), a diol unit (P5) represented by Formula (P5), and a diol unit (P6) represented by Formula (P6), the polyester resin (1) further includes a unit including a biphenyl skeleton, and end groups of the polyester resin (1) do not include fluorine atoms, $Ar^{T1}$-$L^{T1}$-$Ar^{T2}$ Formula (T)

in Formula (T), $Ar^{T1}$ is an optionally substituted naphthyl group or an optionally substituted biphenyl group, $L^{T1}$ is a single bond or an ether bond, and $Ar^{T2}$ is an optionally substituted aryl group having 6 or more and 12 or less carbon atoms or an optionally substituted aralkyl group having 7 or more and 20 or less carbon atoms, Formula (P1)

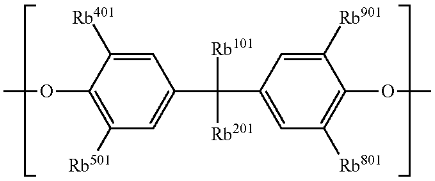

Formula (P2)

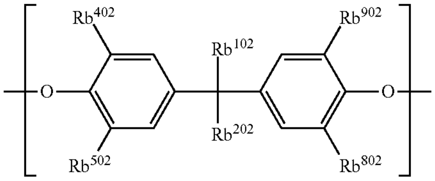

-continued

Formula (P3)

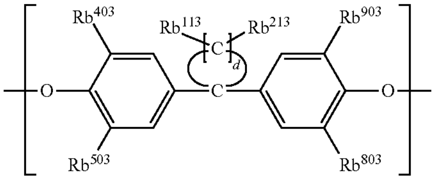

Formula (P5)

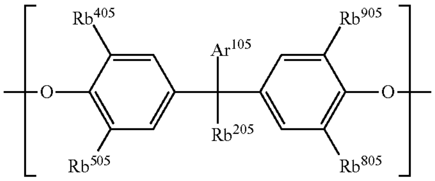

Formula (P6)

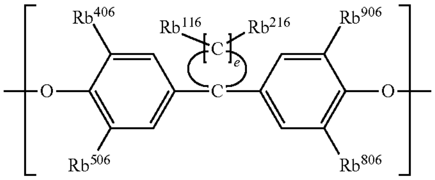

in Formula (P1), $Rb^{101}$ is a branched alkyl group having 4 or more and 20 or less carbon atoms, $Rb^{201}$ is a hydrogen atom or an alkyl group having 1 or more and 3 or less carbon atoms, and $Rb^{401}$, $Rb^{501}$, $Rb^{801}$, and $Rb^{901}$ are each independently a hydrogen atom, an alkyl group having 1 or more and 4 or less carbon atoms, an alkoxy group having 1 or more and 6 or less carbon atoms, or a halogen atom, in Formula (P2), $Rb^{102}$ is a linear alkyl group having 4 or more and 20 or less carbon atoms, $Rb^{202}$ is a hydrogen atom or an alkyl group having 1 or more and 3 or less carbon atoms, and $Rb^{402}$, $Rb^{502}$, $Rb^{802}$, and $Rb^{902}$ are each independently a hydrogen atom, an alkyl group having 1 or more and 4 or less carbon atoms, an alkoxy group having 1 or more and 6 or less carbon atoms, or a halogen atom, in Formula (P3), $Rb^{113}$ and $Rb^{213}$ are each independently a hydrogen atom, a linear alkyl group having 1 or more and 3 or less carbon atoms, an alkoxy group having 1 or more and 4 or less carbon atoms, or a halogen atom, d is an integer of 7 or more and 15 or less, and $Rb^{403}$, $Rb^{503}$, $Rb^{803}$, and $Rb^{903}$ are each independently a hydrogen atom, an alkyl group having 1 or more and 4 or less carbon atoms, an alkoxy group having 1 or more and 6 or less carbon atoms, or a halogen atom, in Formula (P5), $Ar^{105}$ is an aryl group having 6 or more and 12 or less carbon atoms or an aralkyl group having 7 or more and 20 or less carbon atoms, $Rb^{205}$ is a hydrogen atom or an alkyl group having 1 or more and 3 or less carbon atoms, and $Rb^{405}$, $Rb^{505}$, $Rb^{805}$, and $Rb^{905}$ are each independently a hydrogen atom, an alkyl group having 1 or more and 4 or less carbon atoms, an alkoxy group having 1 or more and 6 or less carbon atoms, or a halogen atom, and in Formula (P6), $Rb^{116}$ and $Rb^{216}$ are each independently a hydrogen atom, a linear alkyl group having 1 or more and 3 or less carbon atoms, an alkoxy group having 1 or more and 4 or less carbon atoms, or a halogen atom, e is an integer of 4 or more and 6 or less, and $Rb^{406}$, $Rb^{506}$, $Rb^{806}$, and $Rb^{906}$ are each independently a hydrogen atom, an alkyl group having 1 or more and 4 or less carbon atoms, an alkoxy group having 1 or more and 6 or less carbon atoms, or a halogen atom.

2. The electrophotographic photoreceptor according to claim 1, wherein the unit including the biphenyl skeleton is a dicarboxylic acid unit (A2) represented by Formula (A2), Formula (A2)

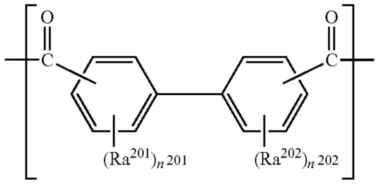

in Formula (A2), $n^{201}$ and $n^{202}$ are each independently an integer of 0 or more and 4 or less, and $n^{201}$ $Ra^{201}$'s and $n^{202}$ $Ra^{202}$'s are each independently an alkyl group having 1 or more and 10 or less carbon atoms, an aryl group having 6 or more and 12 or less carbon atoms, or an alkoxy group having 1 or more and 6 or less carbon atoms.

3. A process cartridge comprising the electrophotographic photoreceptor according to claim 2, wherein the process cartridge is attachable to and detachable from an image forming apparatus.

4. The process cartridge according to claim 3, further comprising a cleaning device including a cleaning blade that is in contact with a surface of the electrophotographic photoreceptor and cleans the surface of the electrophotographic photoreceptor.

5. The electrophotographic photoreceptor according to claim 1, wherein, relative to the polyester resin (1), a mass ratio of the unit including the biphenyl skeleton is 20 mass % or more and 70 mass % or less.

6. A process cartridge comprising the electrophotographic photoreceptor according to claim 5, wherein the process cartridge is attachable to and detachable from an image forming apparatus.

7. The process cartridge according to claim 6, further comprising a cleaning device including a cleaning blade that is in contact with a surface of the electrophotographic photoreceptor and cleans the surface of the electrophotographic photoreceptor.

8. The electrophotographic photoreceptor according to claim 1, wherein, relative to the polyester resin (1), a total mass ratio of the diol unit (P1), the diol unit (P2), the diol unit (P3), the diol unit (P5), and the diol unit (P6) is 30 mass % or more and 90 mass % or less.

9. A process cartridge comprising the electrophotographic photoreceptor according to claim 8, wherein the process cartridge is attachable to and detachable from an image forming apparatus.

10. The process cartridge according to claim 9, further comprising a cleaning device including a cleaning blade that is in contact with a surface of the electrophotographic photoreceptor and cleans the surface of the electrophotographic photoreceptor.

11. The electrophotographic photoreceptor according to claim 1, wherein, relative to 100 parts by mass of the polyester resin, a content of the compound (T) is 1 part by mass or more and 20 parts by mass or less.

12. The electrophotographic photoreceptor according to claim 11, wherein, relative to 100 parts by mass of the polyester resin, the content of the compound (T) is 4 parts by mass or more and 10 parts by mass or less.

13. A process cartridge comprising the electrophotographic photoreceptor according to claim 12, wherein the process cartridge is attachable to and detachable from an image forming apparatus.

14. The process cartridge according to claim 13, further comprising a cleaning device including a cleaning blade that is in contact with a surface of the electrophotographic photoreceptor and cleans the surface of the electrophotographic photoreceptor.

15. A process cartridge comprising the electrophotographic photoreceptor according to claim 11, wherein the process cartridge is attachable to and detachable from an image forming apparatus.

16. The process cartridge according to claim 15, further comprising a cleaning device including a cleaning blade that is in contact with a surface of the electrophotographic photoreceptor and cleans the surface of the electrophotographic photoreceptor.

17. A process cartridge comprising the electrophotographic photoreceptor according to claim 1, wherein the process cartridge is attachable to and detachable from an image forming apparatus.

18. The process cartridge according to claim 17, further comprising a cleaning device including a cleaning blade that is in contact with a surface of the electrophotographic photoreceptor and cleans the surface of the electrophotographic photoreceptor.

19. An image forming apparatus comprising:

the electrophotographic photoreceptor according to claim 1, a charging device that charges a surface of the electrophotographic photoreceptor;

an electrostatic latent image forming device that forms an electrostatic latent image on the charged surface of the electrophotographic photoreceptor;

a developing device that uses a developer containing toner to develop the electrostatic latent image on the surface of the electrophotographic photoreceptor to form a toner image; and a transfer device that transfers the toner image onto a surface of a recording medium.

20. The image forming apparatus according to claim 19, further comprising a cleaning device including a cleaning blade that is in contact with the surface of the electrophotographic photoreceptor and cleans the surface of the electrophotographic photoreceptor.

* * * * *